US012241573B2

(12) United States Patent
Deutsch et al.

(10) Patent No.: US 12,241,573 B2
(45) Date of Patent: Mar. 4, 2025

(54) BRACE CLAMP FOR SWAY BRACE PIPE

(71) Applicant: ASC ENGINEERED SOLUTIONS, LLC, Portsmouth, NH (US)

(72) Inventors: John Otto Deutsch, Fullerton, CA (US); Michael A. Budrow, Warwick, RI (US); Patrick Chien Chen, North Kingstown, RI (US); Aaron Jonathon Kracke, Pawtucket, RI (US)

(73) Assignee: ASC ENGINEERED SOLUTIONS, LLC, Oak Brook, IL (US)

( * ) Notice: Subject to any disclaimer, the term of this patent is extended or adjusted under 35 U.S.C. 154(b) by 0 days.

(21) Appl. No.: 17/969,013

(22) Filed: Oct. 19, 2022

(65) Prior Publication Data

US 2024/0133489 A1 Apr. 25, 2024
US 2024/0229976 A9 Jul. 11, 2024

(51) Int. Cl.
*F16L 3/10* (2006.01)

(52) U.S. Cl.
CPC ................. *F16L 3/1091* (2013.01)

(58) Field of Classification Search
CPC . F16L 3/1091; F16L 3/133; F16B 2/10; F16B 7/0493
See application file for complete search history.

(56) References Cited

U.S. PATENT DOCUMENTS

| | | | |
|---|---|---|---|
| 1,763,634 A | 6/1930 | Agobian | |
| 2,194,883 A | 10/1938 | Burton | |
| 5,018,768 A | 5/1991 | Palatchy | |
| 6,041,823 A * | 3/2000 | Kusama | F16B 7/0486 411/338 |
| 6,464,268 B1 | 10/2002 | Hough et al. | |
| 7,490,388 B2 | 2/2009 | van Walraven | |

(Continued)

FOREIGN PATENT DOCUMENTS

DE 102008022207 4/2009
FR 2614657 * 11/1988

(Continued)

OTHER PUBLICATIONS

Glarks clevis pin assortment kit sold on amazon.com dated Aug. 31, 2020, https://www.amazon.com/Glarks-Stainless-Single-Clevis-Assortment/dp/B08H1J95VR (Year: 2020).*

(Continued)

*Primary Examiner* — Eret C McNichols
*Assistant Examiner* — Ding Y Tan
(74) *Attorney, Agent, or Firm* — McAndrews, Held & Malloy, Ltd.

(57) ABSTRACT

A brace clamp includes a first jaw; a second jaw pivotably coupled to the first jaw, wherein a clamp channel is defined between the first jaw and the second jaw, the clamp channel configured to receive a sway brace pipe therethrough; and a clamp fastener coupled to the first jaw; w the brace clamp is configurable in a disengaged configuration and an engaged configuration; and wherein, in the disengaged configuration, the first jaw is pivoted away from the second jaw and the clamp fastener is disengaged from the second jaw, and in the (Continued)

engaged configuration, the first jaw is pivoted towards the second jaw and the clamp fastener is engaged with the second jaw.

12 Claims, 18 Drawing Sheets

(56) References Cited

U.S. PATENT DOCUMENTS

| | | | | |
|---|---|---|---|---|
| 7,523,895 | B1* | 4/2009 | Kirschner | F16L 3/04 |
| | | | | 248/65 |
| 8,070,113 | B1* | 12/2011 | Kirschner | F16L 3/245 |
| | | | | 248/65 |
| D711,730 | S | 8/2014 | McKiernan | |
| 9,004,421 | B2 | 4/2015 | Feenstra | |
| 9,004,422 | B2 | 4/2015 | Feenstra | |
| 9,174,077 | B2 | 11/2015 | Lim | |
| 9,518,684 | B2 | 12/2016 | Juzak et al. | |
| 9,651,179 | B2 | 5/2017 | Krueger et al. | |
| D856,123 | S | 8/2019 | Bancroft et al. | |
| 10,982,801 | B2 | 4/2021 | Lecbych et al. | |
| D933,467 | S | 10/2021 | Von Fange | |
| 11,199,278 | B2 | 12/2021 | Brouwer et al. | |
| 2002/0023990 | A1* | 2/2002 | Heath | B25B 5/006 |
| | | | | 248/230.1 |
| 2002/0070317 | A1* | 6/2002 | Goodman | F16L 3/223 |
| | | | | 248/68.1 |
| 2004/0031887 | A1* | 2/2004 | Heath | F16L 3/133 |
| | | | | 248/62 |
| 2008/0098578 | A1 | 5/2008 | Collie | |
| 2010/0146906 | A1 | 6/2010 | Heath | |
| 2011/0017880 | A1* | 1/2011 | Osborn | F16L 25/08 |
| | | | | 248/74.1 |
| 2021/0123545 | A1* | 4/2021 | Tsai | F16L 3/1075 |
| 2021/0310584 | A1 | 10/2021 | Koehler et al. | |
| 2022/0057021 | A1* | 2/2022 | Budziszek | F16B 2/065 |
| 2022/0390041 | A1* | 12/2022 | Park | F16B 7/0433 |

FOREIGN PATENT DOCUMENTS

| | | | | |
|---|---|---|---|---|
| GB | 1393094 | * | 5/1975 | |
| GB | 1535326 | | 12/1978 | |
| GB | 2352475 A | * | 1/2001 | F16B 2/10 |
| JP | 2010138930 A | * | 6/2010 | |
| WO | 2013057692 | | 4/2013 | |
| WO | WO-2013057692 A1 | * | 4/2013 | |
| WO | 2015040012 | | 3/2015 | |
| WO | WO-2015040012 A1 | * | 3/2015 | |
| WO | WO-2021245231 A1 | * | 12/2021 | |

OTHER PUBLICATIONS

Dixonvalve clever clamp® youtube video dated Oct. 5, 2021, https://www.youtube.com/watch?v=xcEWoTIMT4o (Year: 2021).*
Lozome sanitary clamp sold on amazon, dated Apr. 8, 2021, https://www.amazon.com/LOZOME-Pressure-Sanitary-Stainless-Connection/dp/B09231RNSJ?th=1 (Year: 2021).*
Thorn boat bimini rail mount sold on amazon, first available date: Dec. 31, 2020, https://www.amazon.com/Thorn-Bimini-Hinged-Stainless-Hardware/dp/B08RS1H8HY?th=1 (Year: 2020).*
Erico; Catalog for Fire Sprinkler Hanging and Bracing Products, Copyright 2013, 128 pgs.
Erico; Catalog for Quick Grip Lateral Sway Brace, Copyright 2014, 3 pgs.
Scaffold Express; Article entitled: "Scaffold I-Bolt Half Clamp—PSV-904", located at <https://scaffoldexpress.com/Scaffold-I-Bolt-Half-Clamp-p/psv-904.htm?gclid=Cj0KCQiAosmPBhCPARIsAHOen-PWXHm3BhDgVvjj_UAc-95vudtz%E2%80%A6>, accessed on Jan. 27, 2022, 3 pgs.
Deutsch, John Otto; International Search Report and Written Opinion for PCT Application No. PCT/US2023/033654, filed Sep. 26, 2023, mailed Jan. 17, 2024, 19 pgs.

* cited by examiner

BRACE CLAMP FOR SWAY BRACE PIPE

TECHNICAL FIELD

This disclosure relates to sway bracing of pipes. More specifically, this disclosure relates to a brace clamp for securing a sway brace pipe to a suspended pipe.

BACKGROUND

Pipes which are suspended with hangers in a building structure are sometimes mounted to sway brace pipes, which can restrict or prohibit movement of the system piping in response to seismic activity (e.g., seismic loads from an earthquake or settling of the building structure) and prevent breakage, leaking, or other failures of the system piping. Sway brace pipes can be of varying sizes, as needed for varying seismic loads. However, sway brace fittings often do not have the ability to accommodate multiple sizes of sway brace pipes. Furthermore, the installation process of assembling the sway brace pipe to the suspended pipe can be difficult and time-consuming. For example, installers often must hold both the sway brace pipe and the sway brace fitting while tightening fasteners. It can also be difficult to properly position the various components during installation.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a brace clamp comprising a first jaw; a second jaw pivotably coupled to the first jaw, wherein a clamp channel is defined between the first jaw and the second jaw, the clamp channel configured to receive a sway brace pipe therethrough; and a clamp fastener coupled to the first jaw; w the brace clamp is configurable in a disengaged configuration and an engaged configuration; and wherein, in the disengaged configuration, the first jaw is pivoted away from the second jaw and the clamp fastener is disengaged from the second jaw, and in the engaged configuration, the first jaw is pivoted towards the second jaw and the clamp fastener is engaged with the second jaw.

Also disclosed is a sway brace fitting assembly comprising a pipe strap comprising substantially U-shaped strap body configured to cradle a suspended pipe; a sway brace pipe; and a brace clamp coupled to the pipe strap and comprising a first jaw and a second jaw, wherein a clamp channel is defined between the first jaw and the second jaw, the sway brace pipe received through the clamp channel; wherein the brace clamp is configurable in a disengaged configuration, wherein the first jaw is pivoted away from the second jaw and the brace clamp is unattached to the sway brace pipe, and an engaged configuration, wherein the first jaw is pivoted towards the second jaw to clamp the sway brace pipe between the first jaw and the second jaw and the brace clamp is attached to the sway brace pipe.

A method of coupling a brace clamp to a sway brace pipe, the method comprising receiving the sway brace pipe through a clamp channel of the brace clamp in a disengaged configuration of the brace clamp, wherein the clamp channel is defined between a first jaw of the brace clamp and a second jaw of the brace clamp; pivoting the first jaw towards the second jaw, wherein a clamp fastener of the brace clamp is coupled to the first jaw; and coupling the clamp fastener to the second jaw to retain the brace clamp in an engaged configuration, wherein, in the engaged configuration, the sway brace pipe is clamped between first jaw and the second jaw.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
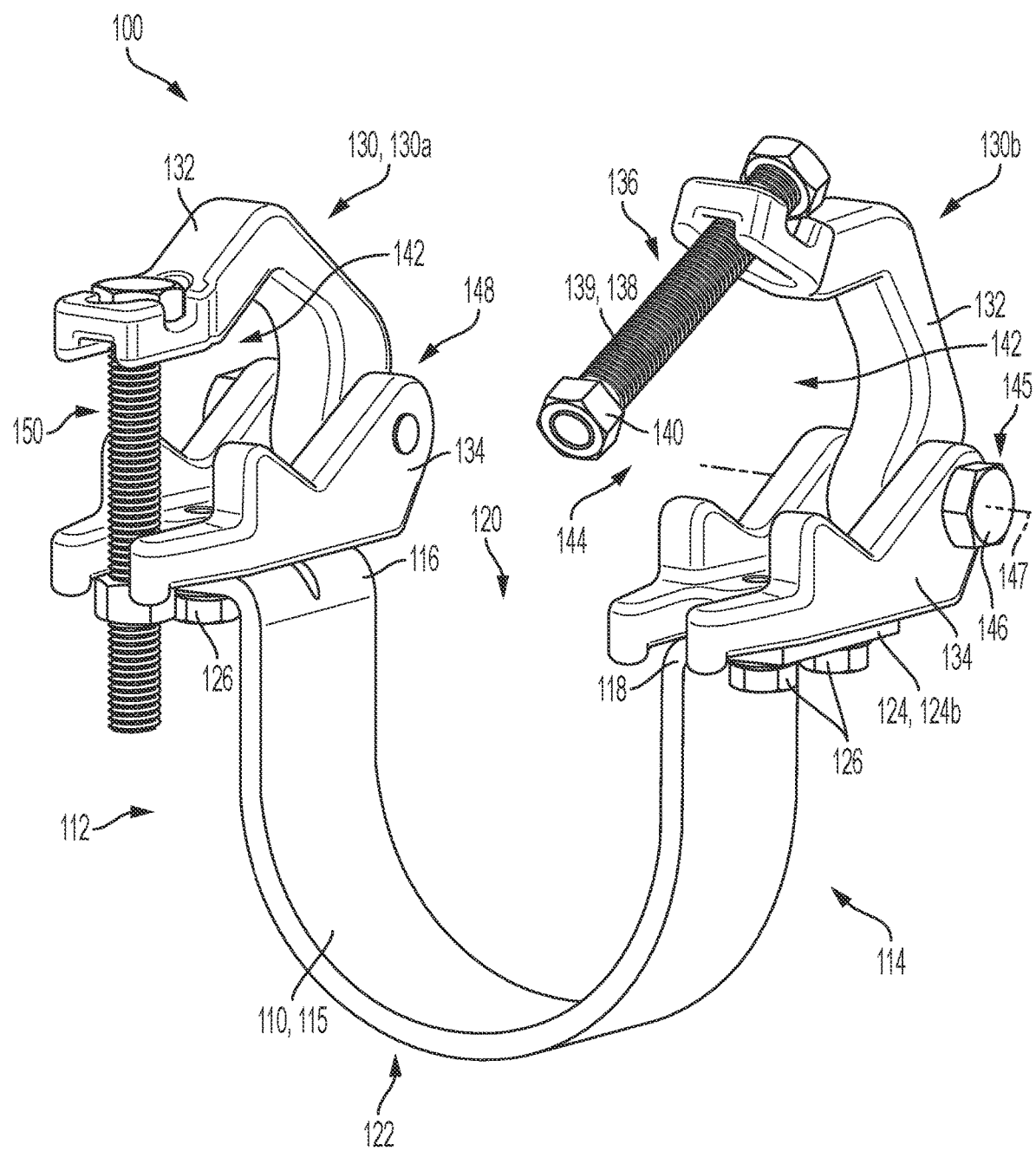
FIG. 1 is a perspective view of a sway brace fitting assembly comprising a pair of brace clamps coupled to a suspended pipe strap, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance can or cannot occur and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements, and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application, including, but not limited to, steps in disclosed methods. Thus, if there are a variety of additional steps that can be performed, it is understood that each of these additional steps can be performed with any specific aspect or combination of aspects of the disclosed methods.

Disclosed is a sway brace fitting for a suspended pipe and associated methods, systems, devices, and various apparatus. Example aspects of the sway brace fitting can comprise a first jaw, a second jaw, and a clamp fastener. It would be understood by one of skill in the art that the sway brace fitting is described in but a few exemplary embodiments among many. No particular terminology or description should be considered limiting on the disclosure or the scope of any claims issuing therefrom.

FIG. 1 is a perspective view of a sway brace fitting assembly 100, in accordance with one aspect of the present disclosure. According to example aspects, the sway brace fitting assembly 100 can be configured to support a suspended pipe, shown as piping 820 (shown in FIG. 8). For example, the piping 820 may be suspended from a wall or ceiling of a building structure. Example aspects of the sway brace fitting assembly 100 can comprise a pipe strap 110 and one or more brace clamps 130 mounted to the pipe strap 110. As shown, in the present aspect, the brace clamps 130 can comprise a first brace clamp 130a and a second brace clamp 130b. Other aspects can comprise more or fewer brace clamps 130. In the present view, the first brace clamp 130a is oriented in an engaged configured (i.e., a closed configuration), and the second brace clamp 130b is oriented in a disengaged configuration (i.e., an open configuration), which are described in further detail below.

Example aspects of the pipe strap 110 can comprise a substantially U-shaped strap body 115 configured to cradle a portion of the suspended piping 820. The U-shaped strap body 115 can define a terminal first strap end 116 generally at a first side 112 of the pipe strap 110 and a terminal second strap end 118 opposite the first strap end 116 and generally at a second side 114 of the pipe strap 110. Each of the first strap end 116 and the second strap end 118 can generally be oriented at a top side 120 of the U-shaped strap body 115, relative to the orientation shown, wherein the top side 120 can be substantially opposite a bottom side 122. The pipe strap 110 can further comprise a strap mount 124 extending laterally outwards from each of the first and second strap ends 116,118 of the U-shaped strap body 115. As shown, the first brace clamp 130a can be mounted to a first strap mount 124a (shown in FIG. 2) of the strap mounts 124 and the second brace clamp 130b can be mounted to a second strap mount 124b of the strap mounts 124. One or more mounting fasteners 126 can be provided for coupling each brace clamp 130 to the corresponding strap mounts 124.

According to example aspects, each brace clamp 130 can comprise a first jaw 132, a second jaw 134, and a clamp fastener 136. In the present aspect, the first jaw 132 can be an upper jaw 132, and the second jaw 134 can be a lower jaw 134. Any of the upper jaws 132 described in the present disclosure could also or alternatively be formed as the lower jaw 134, and any of the lower jaws 134 described in the present disclosure could also or alternatively be formed as the upper jaw 132. Each of the lower jaws 134 can be coupled to the corresponding strap mount 124 by the mounting fasteners 126. A clamp channel 142 can be defined between the upper jaw 132 and the lower jaw 134 of each brace clamp 130. Furthermore, the upper jaw 132 can be pivotably coupled to the lower jaw 134 by a hinge 145. Example aspect of the hinge 145 can comprise a hinge pin 146, as shown. In the present aspect, the hinge 145 can be disposed proximate to a rear clamp end 148 of the brace clamp 130, and the clamp fastener 136 can be disposed proximate to a front clamp end 150 of the brace clamp 130. In the disengaged configuration, as illustrated by the first brace clamp 130a, the upper jaw 132 can be pivoted away from the lower jaw 134 about a lateral hinge axis 147 to widen the clamp channel 142 therebetween. The brace clamp 130 can be unattached to the sway brace pipe 830 in the disengaged configuration, such that the sway brace pipe 830 can be movable relative to the brace clamp 130. A sway brace pipe 830 (shown in FIG. 8) can be inserted through the clamp channel 142 in the disengaged position, and the hinged connection between the upper jaw 132 and the lower jaw 134 can allow the clamp channel 142 to be widened as needed to accommodate sway brace pipes 830 of varying diameters.

In example aspects, the upper jaw 132 and the lower jaw 134 of each brace clamp 130 can be formed from a metal material, and in some aspects, the brace clamps 130 can be formed from a cast metal, such as cast ductile iron, or formed from sheet metal. In other aspects, such as the aspect shown in FIG. 15, the brace clamps 130 can be formed from sheet metal. In other aspects, the metal material can be, for example, iron, aluminum, or the like. For example, each of the upper jaw 132 and the lower jaw 134 can be cast monolithically (i.e., formed as a singular component that constitutes a single material without joints or seams). In other aspects, the brace clamps 130 can comprise any other suitable material or combination of materials, including, but not limited to, other metals, plastics, composites, and the like, and the brace clamps 130 can be formed by any suitable manufacturing technique including being formed from sheet metal. In some aspects, the configuration, material, and manufacturing method of the upper jaw 132 and the lower jaw 134 can be determined based on performance requirements.

In example aspects, in the disengaged configuration, the clamp channels 142 of each brace clamp 130 can be open to define an open channel end 144 at the front clamp end 150, as shown. The sway brace pipe 830 can be inserted rearwardly into the clamp channels 142 of the brace clamps 130 (i.e., in a direction towards the rear clamp end 148) through the open channel ends 144 thereof, or the sway brace pipe 830 can be inserted laterally through the clamp channels 142 of the brace clamps 130 (i.e., in a direction from the first side 112 of the pipe strap 110 to the second side 114 of the pipe strap 110 or from the second side 114 to the first side 112). Moreover, in the present aspect, both the first and second brace clamps 130a,b can be forward-facing (i.e., the open channel end 144 of the clamp channel 142 can be disposed at the front clamp end 150). In other aspects, both of the first and second brace clamps 130a,b can be rearward-facing (i.e., the open channel end 144 of the clamp channel 142 can be disposed at the rear clamp end 148.) In other aspects, the first brace clamp 130a can be forward-facing, and the second brace clamp 130b can be rearward-facing, or vice versa.

In the engaged configuration, the upper jaw 132 can be pivoted towards the lower jaw 134 to clamp the sway brace pipe 830 between the upper jaw 132 and the lower jaw 134. The brace clamp 130 can be secured in the engaged configuration by the clamp fastener 136. According to example aspects, each of the clamp fasteners 136 can comprise a threaded clamp bolt 138 and a clamp nut 140. The threaded clamp bolt 138 can be a hex bolt 139, for example. In other aspects, the clamp fasteners 136 can comprise any other suitable mechanical fasteners known in the art. The threaded clamp bolt 138 can extend through the upper jaw 132, as shown. In the disengaged configuration, the threaded clamp bolt 138 can be disengaged from the lower jaw 134. In the engaged configuration, the threaded clamp bolt 138 can engage the lower jaw 134, and the clamp nut 140 can be tightened on the threaded clamp bolt 138 to draw the upper jaw 132 towards the lower jaw 134, clamping the sway brace pipe 830 (shown in FIG. 8) therebetween. In example aspects, the clamp nut 140 can be a torque-off nut 1510 (shown in FIG. 15), for example and without limitations. The brace clamp 130 can be attached to the sway brace pipe 830 in the engaged configuration, such that the sway brace pipe 830 can be retained in a secured position relative to the brace clamp 130.

Figure 2:
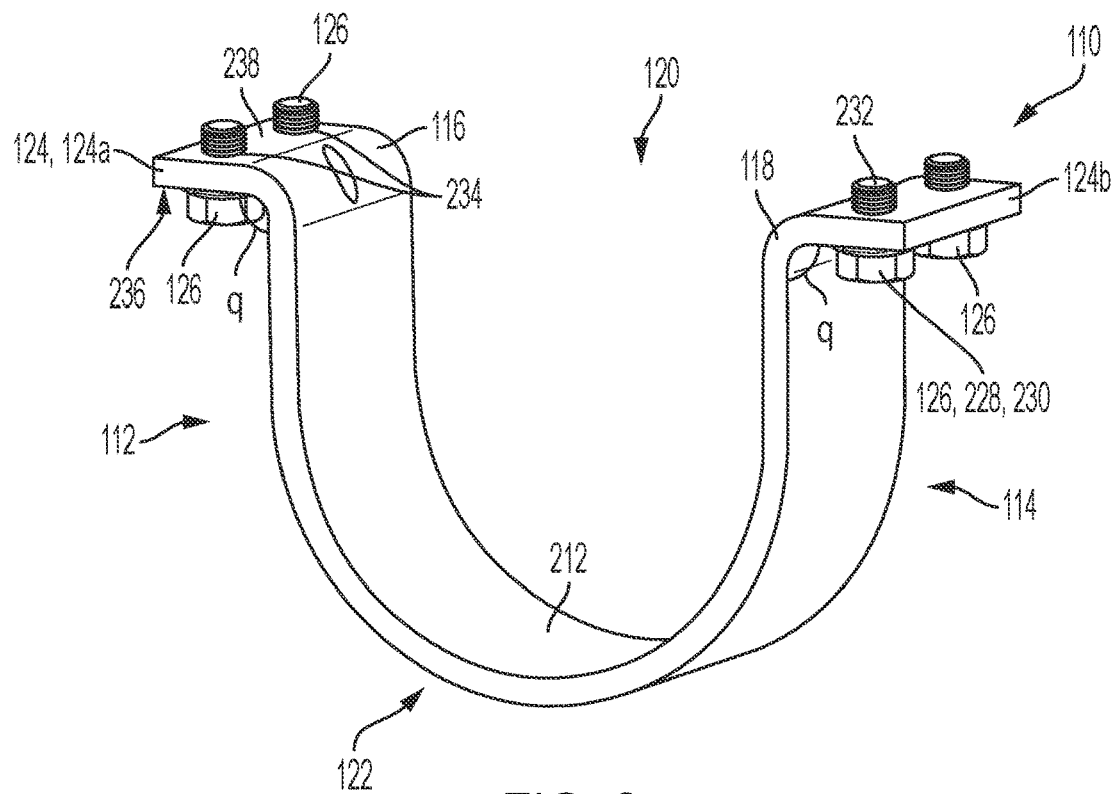
FIG. 2 is a perspective view of the pipe strap of FIG. 1.

FIG. 2 illustrates the pipe strap 110 in accordance with an example aspect of the present disclosure. As shown, the pipe strap 110 can comprise the substantially U-shaped strap body 115. The U-shaped strap body 115 can define the terminal first strap end 116 at the first side 112 of the pipe strap 110 and the terminal second strap end 118 at the second side 114 of the pipe strap 110. Each of the first strap end 116 and the second strap end 118 can be disposed at the top side 120 of the U-shaped strap body 115, and a curved pipe connection portion 212 can be disposed at the opposite bottom side 122 of the U-shaped strap body 115. The first strap mount 124a can extend laterally outwards from the first strap end 116, and the second strap mount 124b can extend laterally outward from the second strap end 118. In example aspects, a substantially perpendicular angle θ can be defined between each of the first and second strap mounts 124a,b and the U-shaped strap body 115. In the present aspect, the pipe strap 110 can further comprise two of the mounting fasteners 126 extending through each of the first and second strap mounts 124a,b for coupling the first and second brace clamps 130a,b (shown in FIG. 1) thereto. In other aspects, the pipe strap 110 can comprise more or fewer of the mounting fasteners 126.

As shown, each of the mounting fasteners 126 can be a hex head set screw 228 comprising a hexagonal screw head 230 and a threaded screw shaft 232 extending from the hexagonal screw head 230. In other aspects, the brace clamps 130 can be coupled to the pipe strap 110 by any other suitable fastener or fastening technique known in the art, including rivets, welds, and the like. Each of the first and second strap mounts 124a,b can define a pair of a strap mounting holes 234 formed therethrough, and the threaded screw shaft 232 of a corresponding one of the set screws can extend through each of the strap mounting holes 234. Each hexagonal screw head 230 can abut a lower mount surface 236 of the corresponding strap mount 124, and the corresponding brace clamp 130 (shown in FIG. 1) can be supported on an upper mount surface 238 of the strap mount 124. In some aspects, the strap mounting holes 234 and/or clamp 130 mounting holes can be threaded, while in other aspects, the strap mounting holes 234 and/or clamp mounting holes 130 may not be threaded.

Figure 3:
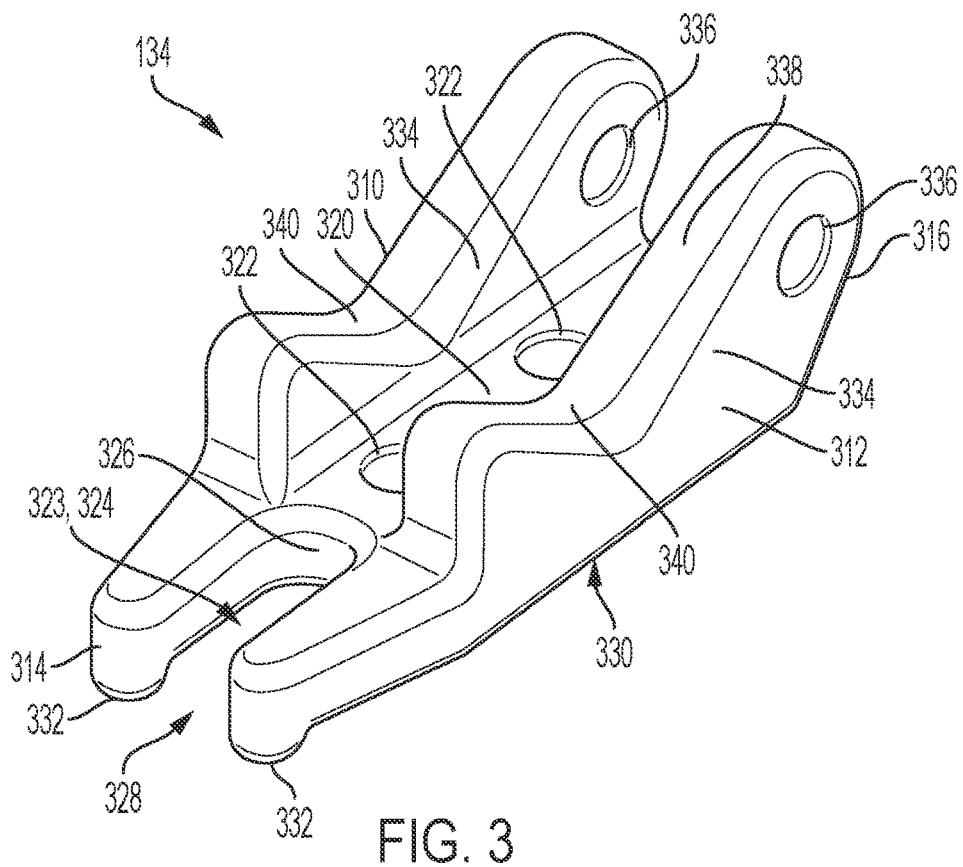
FIG. 3 is a perspective view of a lower jaw of one of the brace clamps of FIG. 1.

FIG. 3 illustrates the lower jaw 134 of one of the brace clamps 130, according to an example aspect. The lower jaw 134 can define a first jaw side 310, a second jaw side 312 opposite the first jaw side 310, a front jaw end 314, and a rear jaw end 316 opposite the front jaw end 314. Furthermore, the lower jaw 134 can comprise a base 320 and a pair of jaw sidewalls 334 extending upward from the base 320 relative to the orientation shown. A first one of the jaw sidewalls 334 can extend from the base 320 at the first jaw side 310, and a second one of the jaw sidewalls 334 can extend from the base 320 at the second jaw side 312. Each of the jaw sidewalls 334 can define a lower hinge opening 336 extending laterally therethrough, proximate to the rear jaw end 316. In example aspects, either or both of the lower hinge openings 336 can be threaded, though in other aspects, either or both the lower hinge openings 336 can be unthreaded. The lower hinge openings 336 can be laterally aligned and can be configured to receive the hinge pin 146 (shown in FIG. 1) therethrough. Furthermore, an upper wall end 338 of each of the jaw sidewalls 334 can be curved or angled to define a lower notch 340 extending downward into the jaw sidewalls 334 towards the base 320. Each of the lower notches 340 can be configured to receive a portion of the sway pipe 830 (shown in FIG. 8) therein. In other aspects, however, the jaw sidewalls 334 may not define the lower notches 340, and the upper wall end 228 of each jaw sidewall 334 can define a substantially flat pipe engagement portion 2510 (shown in FIG. 25). This configuration can allow sway brace pipes 830 of varying sizes to sit at about the same distance from the suspended piping 820 when assembled with the sway brace fitting assembly 100.

The base 320 of the lower jaw 134 can be configured to rest on the upper mount surface 238 (shown in FIG. 2) of the corresponding strap mount 124 (shown in FIG. 1). A pair of clamp mounting holes 322 can be formed longitudinally through the base 320, relative to the orientation shown. The clamp mounting holes 322 can be disposed between the jaw sidewalls 334 in example aspects. The clamp mounting holes 322 can be aligned with the corresponding pair of strap mounting holes 234, and each of the clamp mounting holes 322 can be configured to receive the threaded screw shaft 232 (shown in FIG. 2) of a corresponding one of the set screws (shown in FIG. 2) therethrough. In the present aspect, each clamp mounting hole 322 can be threaded. However, in other aspects, either or both of the clamp mounting holes 322 may not be threaded.

According to example aspects, a fastener aperture 323 can be formed through the base 320. For example, the fastener aperture 323 can be a fastener slot 324 or a threaded fastener hole 1810 (shown in FIG. 18). The fastener slot 324 formed longitudinally through the base 320 can be configured to receive the clamp fastener 136 (shown in FIG. 1) therethrough in the engaged configuration. The fastener slot 324 can extend rearwardly into the base 320 at the front jaw end 314. In the present aspect, the fastener slot 324 can be elongated and define a closed slot end 326 distal to the front jaw end 314. The closed slot end 326 can be substantially curved in the present aspect. In other aspects, the fastener slot 324 may not be elongated, and/or the closed slot end 326 may not be curved. The fastener slot 324 can further define an open slot end 328 opposite the closed slot end 326 at the front jaw end 314 of the lower jaw 134. In the engaged configuration, a threaded bolt shaft 512 (shown in FIG. 5) of the threaded clamp bolt 138 (shown in FIG. 1) of the clamp fastener 136 can extend through the fastener slot 324, and the clamp nut 140 (shown in FIG. 1) can be tightened against a lower base surface 330 of the base 320. The clamp nut 140 may be torque sensitive break away nut type or a standard nut type. In other aspects, the brace clamp 130 may not comprise the clamp nut 140, and the fastener slot 324 of the lower jaw 134 can be replaced with a threaded opening configured to receive the threaded bolt shaft 512 therethrough.

Furthermore, in some aspects, the base 320 can define a pair of positioner tabs 332 extending downward at the front jaw end 314 adjacent to (i.e., next to) the fastener slot 324. Each positioner tab can be disposed on an opposing side of the fastener slot 324. The positioner tabs 332 can be substantially rounded in the present aspect; for example, the positioner tabs 332 can be substantially semispherical, as shown. In other aspects, however, the positioner tabs 332 may not be rounded. According to example aspects, the positioner tabs 332 can be configured to engage the clamp nut 140 to prevent the threaded clamp bolt 138 from sliding out of the fastener slot 324 through the open slot end 328. Other aspects may not comprise the positioner tabs 332.

Figure 4:
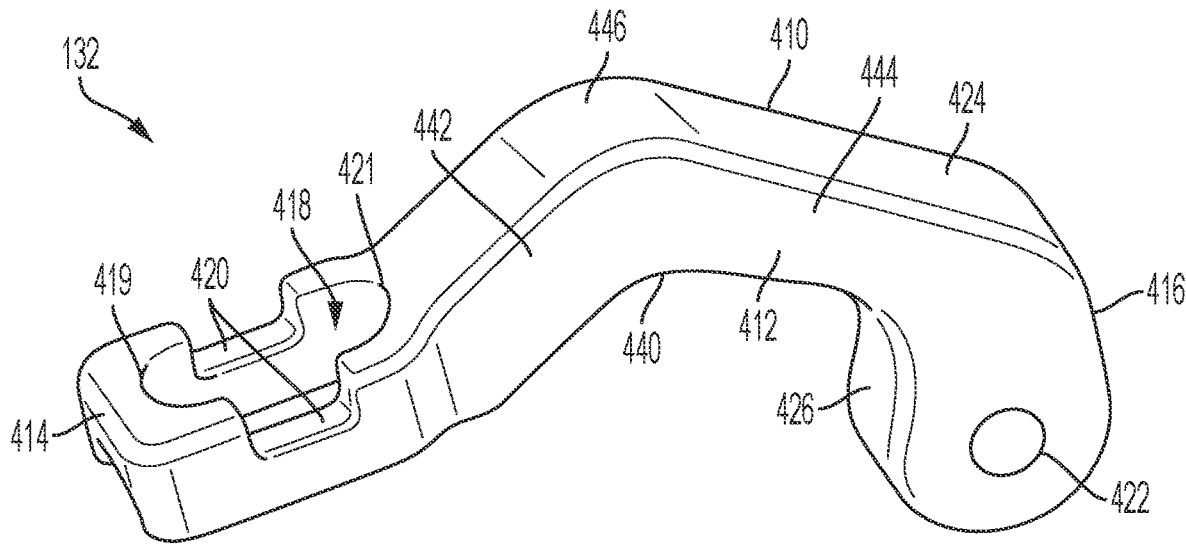
FIG. 4 is a perspective view of an upper jaw of one of the brace clamps of FIG. 1.

FIG. 4 illustrates the upper jaw 132 of one of the brace clamps 130 (shown in FIG. 1), according to an example aspect. The upper jaw 132 can define a first jaw side 410, a second jaw side 412 opposite the first jaw side 410, a front jaw end 414, and a rear jaw end 416 opposite the front jaw end 414. In the present aspect, a fastener opening 418 can be defined longitudinally through the upper jaw 132 at the front jaw end 414. The fastener opening 418 can be configured to receive the threaded bolt shaft 512 (shown in FIG. 5) of the threaded clamp bolt 138 (shown in FIG. 1) of the clamp fastener 136 (shown in FIG. 1) therethrough. In example aspects, the fastener opening 418 can define a curved front end 419 and a curved rear end 421, as shown. The curved front and rear ends 419,421 can allow the threaded clamp bolt 138 to swing more freely therein and can aid in properly seating the threaded clamp bolt 138 when it is tightened in the engaged configuration over sway brace pipes 830 (shown in FIG. 8) of varying sizes. In example aspects, a fastener notch 420 can extend into an upper jaw surface 424 of the upper jaw 132 adjacent to (i.e., next to) the fastener opening 418 at both sides of the fastener opening 418. A first one of the fastener notches 420 can be formed at or near the first jaw side 410, and a second one of the fastener notches 420 can be formed at or near the second jaw side 412. According to example aspects, a bolt head 510 (shown in FIG. 5) of the threaded clamp bolt 138 can engage the fastener notches 420, and the fastener notches 420 can prohibit the threaded clamp bolt 138 from rotating as the clamp nut 140 (shown in FIG. 1) is being tightened, as well as after the clamp nut 140 has been tightened.

An upper hinge opening 422 can be formed laterally through the upper jaw 132, proximate to the rear jaw end 416. In example aspects, the upper hinge opening 422 can be threaded, though, in other aspects, the upper hinge opening 422 can be unthreaded. The upper hinge opening 422 can be laterally aligned between the lower hinge openings 336 (shown in FIG. 3) of the lower jaw 134 (shown in FIG. 1) and can be configured to receive the hinge pin 146 (shown in FIG. 1) therethrough. Furthermore, in example aspects, the upper jaw 132 can define a curve(s) or angle(s) between the front jaw end 414, and the rear jaw end 416, such that a lower jaw surface 426 of the upper jaw 132 can define an upper notch 440. For example, the upper jaw 132 can define a first portion 442 extending substantially upward generally from the front jaw end 414 or from the fastener opening 418 to an intermediate point 444 of the upper jaw 132. The upper jaw 132 can further define a second portion 446 extending substantially downward generally from the intermediate point 444 to the lower jaw 134 end. The upper notch 440 can generally be defined between the first portion 442 and the second portion 446 and can be configured to receive a portion of the sway brace pipe 830 therein, as described in further detail below.

Figure 5:
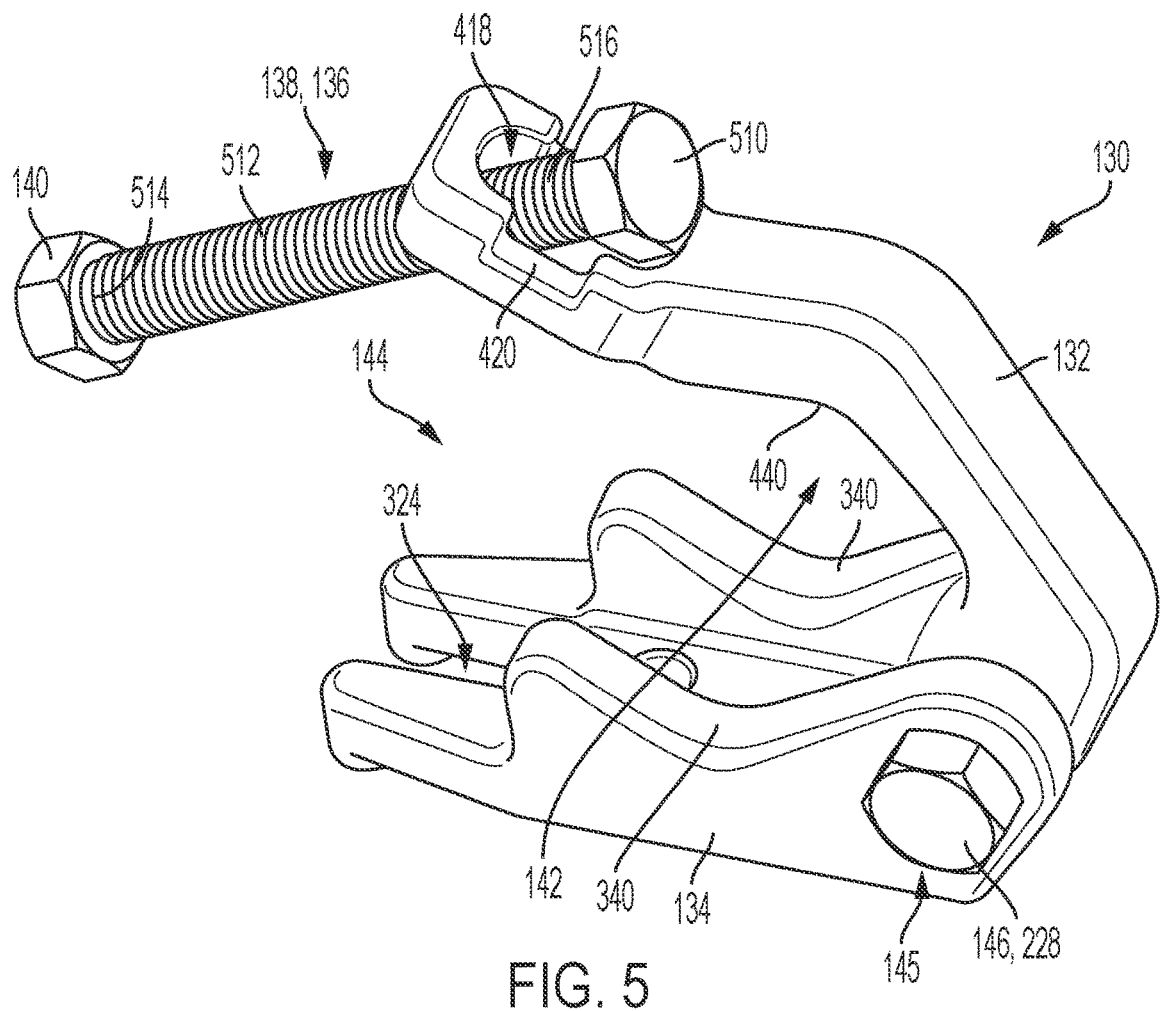
FIG. 5 is a perspective view of one of the brace clamps of FIG. 1 in an open configuration.

FIG. 5 illustrates an example aspect of the brace clamp 130 in the disengaged configuration. The brace clamp 130 can comprise the upper jaw 132 and the lower jaw 134. The lower notches 340 of the lower jaw 134 can face the upper jaw 132, and the upper notch 440 of the upper jaw 132 can face the lower jaw 134. As shown, the clamp channel 142 of the brace clamp 130 can be defined between the lower notches 340 and the upper notch 440. As described above, in the disengaged configuration, the clamp fastener 136 can be disengaged from the lower jaw 134, and the upper jaw 132 can be pivoted upward and away from the lower jaw 134 to widen the clamp channel 142. The hinge pin 146 can pivotably couple the upper jaw 132 to the lower jaw 134, such that the upper jaw 132 can pivot relative to the lower jaw 134 to adjust the size of the clamp channel 142 to accommodate sway brace pipes 830 (shown in FIG. 8) of varying sizes and to easily insert the sway brace pipe 830 therethrough during installation. The hinged connection provided by the hinge 145 can further allow the brace clamp 130 to clamp tightly around the sway brace pipe 830 in the engaged configuration, as shown and described in further detail below with respect to FIG. 7.

Figure 6:
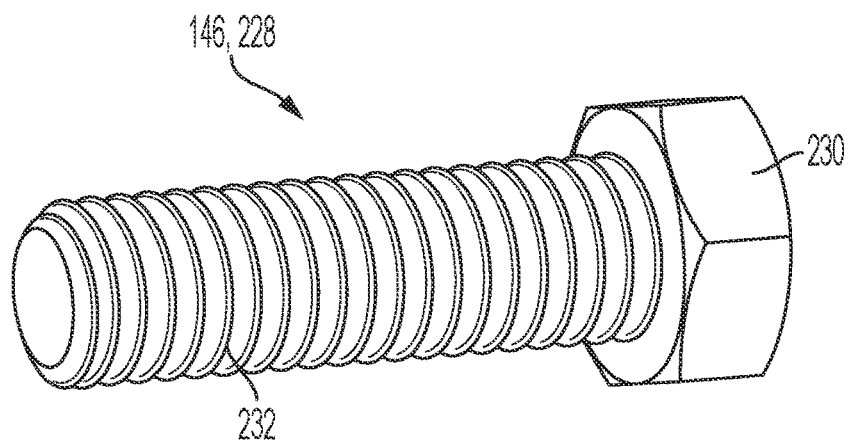
FIG. 6 is a perspective view of a hinge pin of the brace clamp of FIG. 5.

In example aspects, the hinge pin 146 can be another one of the hex head set screws 228, as shown and described in further detail with respect to FIG. 6. In other aspects, the hinge 145 can comprise a clevis pin, removable rivet, a cast-in hook style hinge, or the like. In the present aspect, the hex head set screw 228 can threadedly engage the threaded upper hinge opening 422 (shown in FIG. 4) of the upper jaw 132 and the threaded lower hinge openings 336 (shown in FIG. 3) of the lower jaw 134 to secure the upper jaw 132 to the lower jaw 134. The threaded connection can provide friction between the hinge pin 146 and the upper and lower jaws 132,134 to allow the upper jaw 132 to remain stationary relative to the lower jaw 134 in a desired position until a suitable force is applied. For example, for ease of installing the sway brace fitting assembly 100 (shown in FIG. 1) on the sway brace pipe 830 (shown in FIG. 8), it may be desired to temporarily hold the upper jaw 132 open relative to the lower jaw 134 (i.e., in the disengaged configuration) to prevent the upper jaw 132 from rotating towards or away from the lower jaw 134.

According to example aspects, the threaded bolt shaft 512 of the threaded clamp bolt 138 can extend through the fastener opening 418 of the upper jaw 132. With the upper jaw 132 pivoted away from the lower jaw 134 in the disengaged configuration, the threaded bolt shaft 512 can be disengaged from the fastener slot 324 of the lower jaw 134. The bolt head 510 of the threaded clamp bolt 138 can be configured to engage the fastener notches 420 formed in the upper jaw 132. However, in the disengaged configuration, the threaded clamp bolt 138 can be free to move within the fastener opening 418. Thus, the bolt head 510 may be disengaged from the fastener notches 420, as shown, to provide sufficient clearance at the open channel end 144 for inserting a pre-installed sway brace pipe 830 (shown in FIG. 8) into the clamp channel 142 through the open channel end 144. The clamp nut 140 can be mounted on the threaded bolt shaft 512 at or near a distal shaft end 514 thereof. The distal shaft end 514 can be oriented opposite a proximal shaft end 516 of the threaded bolt shaft 512. The proximal shaft end 516 can be connected to the bolt head 510.

FIG. 6 illustrates an example aspect of the hinge pin 146, which can be one of the hex head set screws 228 in the present aspect. In the present aspect, the hex head set screw 228 of the hinge pin 146 can be substantially the same as the hex head set screws 228 of the mounting fasteners 126 (shown in FIG. 2) that are configured to mount the brace clamp 130 (shown in FIG. 1) to the pipe strap 110 (shown in FIG. 1). For example, the hex head set screws 228 used for both the hinge pin 146 and the mounting fasteners 126 can comprise the hexagonal screw head 230 and the threaded screw shaft 232 extending from the hexagonal screw head 230. As noted above, in other aspects, either or both of the hinge pin 146 and the mounting fasteners 126

Figure 7:
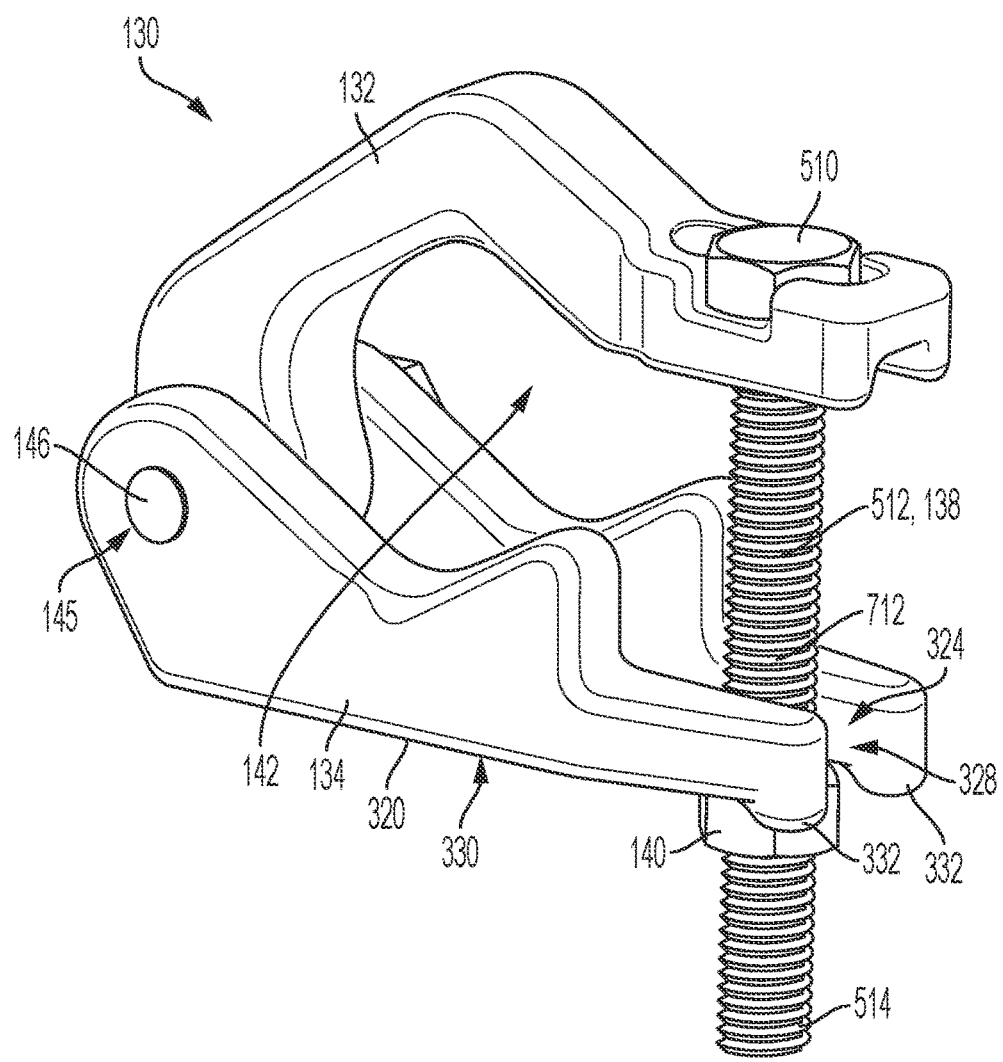
FIG. 7 is a perspective view of the brace clamp of FIG. 5 in a closed configuration.

FIG. 7 illustrates the brace clamp 130 in the engaged configuration. As shown, in the engaged configuration, the upper jaw 132 can be pivoted at the hinge 145 downward towards the lower jaw 134 to narrow the clamp channel 142 and to engage the threaded bolt shaft 512 of the clamp bolt 138 with the fastener slot 324 of the lower jaw 134. As shown, an intermediate portion 712 of the threaded bolt shaft 512 between the distal shaft end 514 and the bolt head 510 can engage the fastener slot 324. As described above, the clamp nut 140 can be mounted on the threaded bolt shaft 512 at or near the distal shaft end 514, such that the clamp nut 140 does not interfere with the initial engagement of the threaded bolt shaft 512 with the fastener slot 324. For example, the intermediate portion 712 of the threaded bolt shaft 512 can be swung into the fastener slot 324 through the open slot end 328, with the clamp nut 140 disposed below the open slot end 328, relative to the orientation shown. The clamp nut 140 can then be tightened on the threaded bolt shaft 512 to abut the lower base surface 330 of the base 320, and the positioner tabs 332 can engage the clamp nut 140 to prevent the threaded clamp bolt 138 from sliding out of the fastener slot 324 through the open slot end 328. In other aspects, the clamp nut 140 may not be pre-installed on the clamp bolt 138, and can be installed thereon after the threaded bolt shaft 512 has been engaged with the fastener slot 324.

Figure 8:
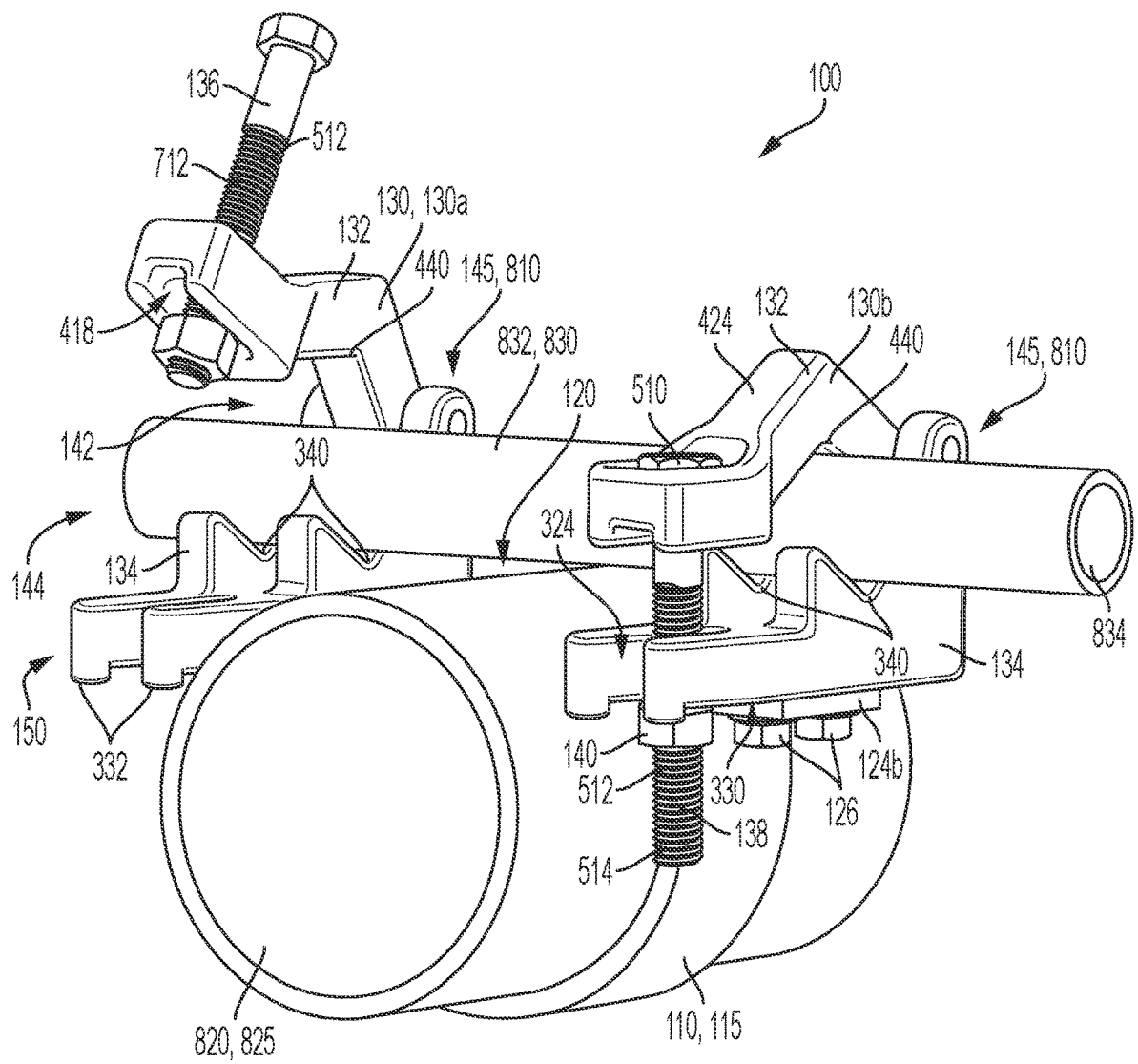
FIG. 8 is a perspective view of the sway brace fitting assembly partially installed on a sway brace pipe and coupled to a suspended pipe, in accordance with another aspect of the present disclosure.

FIG. 8 illustrates the sway brace fitting assembly 100 partially installed on the sway brace pipe 830 and coupled to the suspended piping 820, in accordance with an example aspect of the present disclosure. As shown, the sway brace fitting assembly 100 can comprise the pipe strap 110 and the first and second brace clamps 130a,b. The first and second brace clamps 130a,b can be mounted on the corresponding first and second strap mounts 124a,b (124a shown in FIG. 2) of the pipe strap 110. The lower jaw 134 of each of brace clamp 130 can be coupled to the corresponding strap mount 124 by the one or more mounting fasteners 126. Each of the mounting fasteners 126 can engage the corresponding strap mounting hole 234 (shown in FIG. 3) of the pipe strap 110 and the corresponding clamp mounting hole 322 (shown in FIG. 3) of the brace clamp 130. Each brace clamp 130 can comprise the lower jaw 134 and the upper jaw 132 pivotably coupled at the hinge 145. The brace clamps 130 of the present aspect can be substantially the same as the brace clamps 130 previously shown and described, except the hinge 145 of the present brace clamps 130 can be a multi-position hinge 810, as shown and described in further detail with respect to FIG. 9.

The first brace clamp 130a is illustrated in the disengaged configuration, wherein the first brace clamp 130a is not coupled to the sway brace pipe 830, and as such, the sway brace pipe 830 is not secured to the sway brace fitting assembly 100 at the location of the first brace clamp 130a. The second brace clamp 130b is illustrated in the engaged configured, wherein the second brace clamp 130b is coupled to the sway brace pipe 830 to secure the sway brace pipe 830 to the sway brace fitting assembly 100. In example aspects, the sway brace pipe 830 can extend beyond either side of the illustrated portion and can be configured to attach to a building structure at a distal end thereof. For example, the sway brace pipe 830 can be attached to a support beam, a wall, a ceiling, or other suitable support component of the building structure. According to example aspects, a distal end of the sway brace pipe 830 can be attached to the support component by an I-beam clamp, a wall-mounted bracket, or any other suitable mounting device known in the art. As shown, the sway brace pipe 830 can be configured to extend across the top side 120 of the U-shaped strap body 115. According to example aspects, the sway brace pipe 830 can define a substantially tubular shape and can define a substantially cylindrical outer surface 832 and a substantially cylindrical inner surface 834. The brace clamps 130 can clamp around the outer surface 832 of the sway brace pipe 830 in the engaged configuration to secure the sway brace pipe 830 to the sway brace fitting assembly 100. Moreover, the suspended piping 820 can comprise a system pipe 825, which can be held in position by the U-shaped strap body 115 below the sway brace pipe 830, relative to the orientation shown. In example aspects, the suspended pipe 825 can be oriented about perpendicular to the sway brace pipe 830. The suspended pipe 825 can be part of a piping system (e.g., a water piping system) of the building mechanical system.

Referring to the first brace clamp 130a in the disengaged configuration, the upper jaw 132 can be pivoted away from the lower jaw 134 at the hinge 145 to widen the clamp channel 142, and the sway brace pipe 830 can be received through the clamp channel 142. Specifically, the sway brace pipe 830 can be disposed between the upper notch 440 of the upper jaw 132 and the lower notches 340 of the lower jaw 134. In the present aspect, the sway brace pipe 830 can define a relatively small diameter. A clearance can be provided around at least a portion of the sway brace pipe 830, such as between the sway brace pipe 830 and the upper jaw 132, as shown, such that the clamp channel 142 can be configured to accommodate a sway brace pipe 830 of a larger diameter. The brace clamps 130 could also accommodate sway brace pipes 830 of even smaller diameters. According to example aspects, the sway brace pipe 830 can be inserted laterally through the clamp channel 142. In other aspects, such as aspects wherein the sway brace pipe 830 is pre-installed with the building structure, the sway brace fitting assembly 100 can be mounted on the pre-installed sway brace pipe 830 by inserting the sway brace pipe 830 into the clamp channel 142 through the open channel end 144 thereof at the front clamp end 150. As shown, in the present aspect, the clamp fastener 136 can be drawn upward through the fastener opening 418 of the upper jaw 132, away from the lower jaw 134, to provide unobstructed access to the clamp channel 142 through the open channel end 144.

Referring to the second brace clamp 130b in the engaged configuration, once the sway brace pipe 830 has been received through the clamp channel 142, the upper jaw 132 can be pivoted towards the lower jaw 134 at the hinge 145 to sandwich the sway brace pipe 830 between the upper jaw 132 and the lower jaw 134, and more specifically, between the upper notch 440 and the lower notches 340. The intermediate portion 712 of the threaded bolt shaft 512 can be received through the fastener slot 324 of the lower jaw 134. The clamp nut 140 disposed on the distal shaft end 514 of the threaded bolt shaft 512 can be tightened on the threaded bolt shaft 512 to abut the lower base surface 330 of the lower jaw 134, and the positioner tabs 332 can engage the clamp nut 140 to retain the clamp nut 140 in position and prevent or limit inadvertent loosening or tightening on the clamp nut 140, which can occur due to vibrations. The bolt head 510 of the threaded bolt shaft 512 can nest within the corresponding fastener notches 420 (shown in FIG. 4) to prevent rotation of the threaded bolt shaft 512 as the clamp nut 140 is tightened thereon. In the present aspect, the fastener notches 420 can be formed as part of a circumferential fastener recess 910 (shown in FIG. 9) set into the upper jaw surface 424. The upper jaw 132 can be drawn towards the lower jaw 134 as the clamp nut 140 is tightened, and the sway brace pipe 830 can be clamped therebetween. The clamp nut 140 can be tightened to a suitable torque to properly grip the sway brace pipe 830 between the upper jaw 132 and the lower jaw 134.

As such, once the sway brace pipe 830 has been positioned within the clamp channel 142, the method for coupling the each of the brace clamps 130 to the sway brace pipe 830 can be a quick and easy process comprising just three steps—pivoting the upper jaw 132 towards the lower jaw 134 (or vice versa) and coupling the clamp fastener 136 to the lower jaw 134 to retain the brace clamp 130 in the engaged configuration. For example, in the present aspect, coupling the clamp fastener 136 to the lower jaw 134 can comprise receiving the clamp fastener 136 through the fastener slot 324 and tightening the clamp nut 140 on the threaded clamp bolt 138. To disengage the brace clamp 130 from the sway brace pipe 830, the method can be completed in reverse. That is, the clamp nut 140 can be loosened, the clamp fastener 136 can be swung out of the fastener slot 324, and the upper jaw 132 can be pivoted away from the lower jaw 134 (or vice versa) to widen the clamp channel 142. In other aspects, the fastener aperture 323 can be formed as the threaded fastener hole 1810 (shown in FIG. 18), and coupling the clamp fastener 136 to the lower jaw 134 can comprise rotatably engaging the threaded clamp bolt 138 with the threaded fastener hole 1810. An additional benefit, as described above, is that the brace clamps 130 can be configured to accommodate varying sizes of sway brace pipes 830. Furthermore, aspects of the brace clamps 130 comprising the multi-position hinge 810 can accommodate an even larger variety of sway brace pipes 830.

Figure 9:
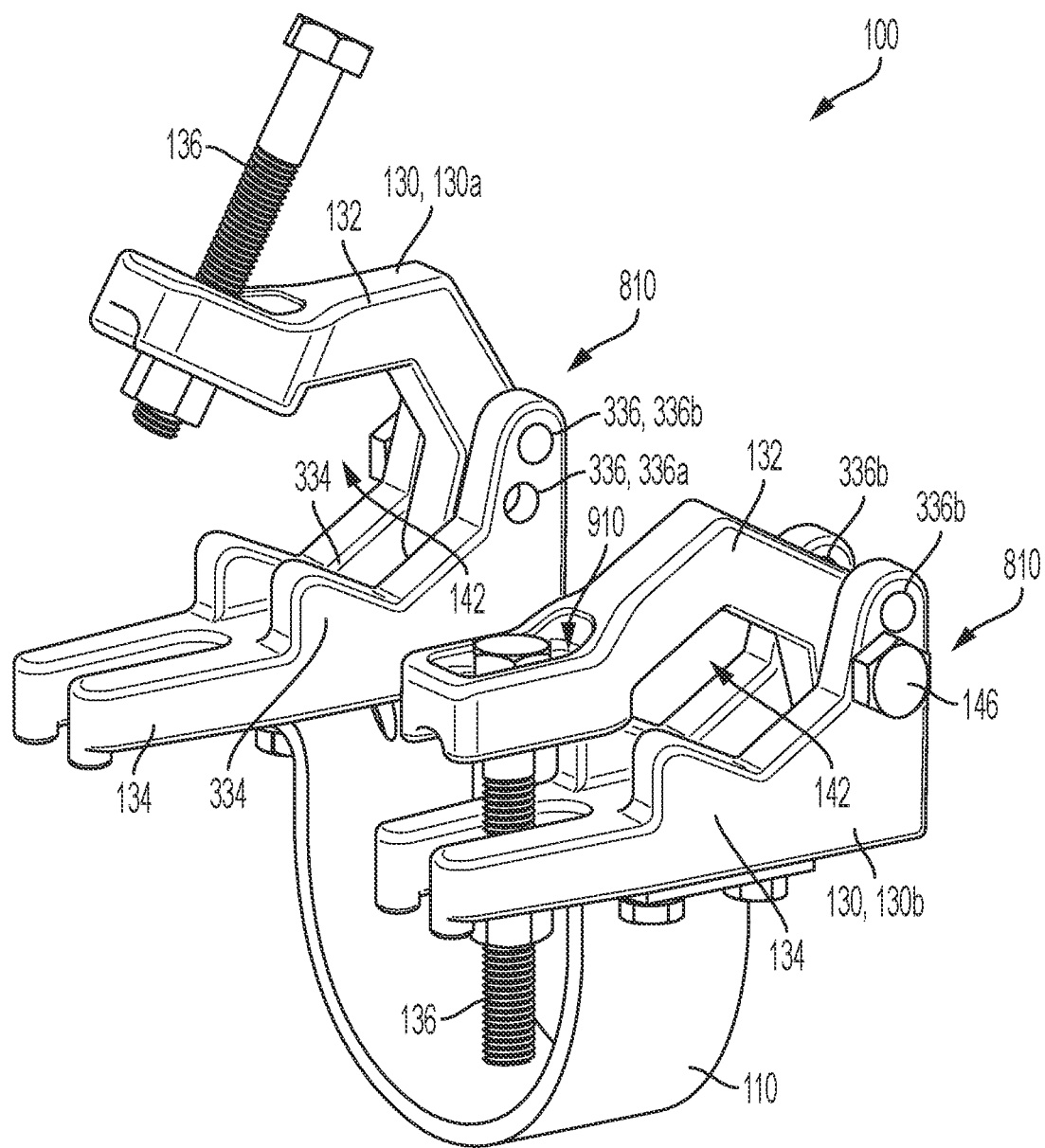
FIG. 9 is a perspective view of the sway brace fitting assembly of FIG. 8.

FIG. 9 illustrates the sway brace fitting assembly 100 comprising the multi-position hinge 810. As shown, the lower jaw 134 of each of the brace clamps 130 can comprise the lower hinge openings 336, as described above. In the present aspect, the lower hinge openings 336 can be a first pair 336a of the lower hinge openings 336, and the lower jaw 134 can further comprise a second pair 336b of the lower hinge openings 336. Like the first pair 336a of lower hinge openings 336 described above, each lower hinge opening 336 of the second pair 336b of lower hinge openings 336 can be formed through a corresponding one of the jaw sidewalls 334. The second pair 336b of lower hinge openings 336 can be disposed above the first pair 336a of lower hinge openings 336, relative to the orientation shown.

In a first position, the hinge pin 146 can be received through either the first pair 336a of the lower hinge openings 336, and in a second position, the hinge pin 146 can be received through the second pair 336b of the lower hinge openings 336. The first or second position can be selected based on the size of the sway brace pipe 830 (shown in FIG. 8). For example, the size of the clamp channel 142 can be reduced when the hinge pin 146 is received through the first pair 336a of the lower hinge openings 336. Thus, the brace clamp 130 can be configured to better accommodate sway brace pipes 830 of smaller diameters in this configuration. Conversely, the size of the clamp channel 142 can be increased when the hinge pin 146 is received through the second pair 336b of the lower hinge openings 336, and thus, the brace clamp 130 can be configured to better accommodate sway brace pipes 830 of larger diameters in this configuration. In other aspects, the lower jaw 134 can comprise more or fewer pairs of the lower hinge openings 336 to allow for further adjustability. In other aspects, the upper jaw 132 can also or alternatively comprise multiple upper hinge openings 422 (shown in FIG. 4) to allow for further adjustability.

Figure 10:
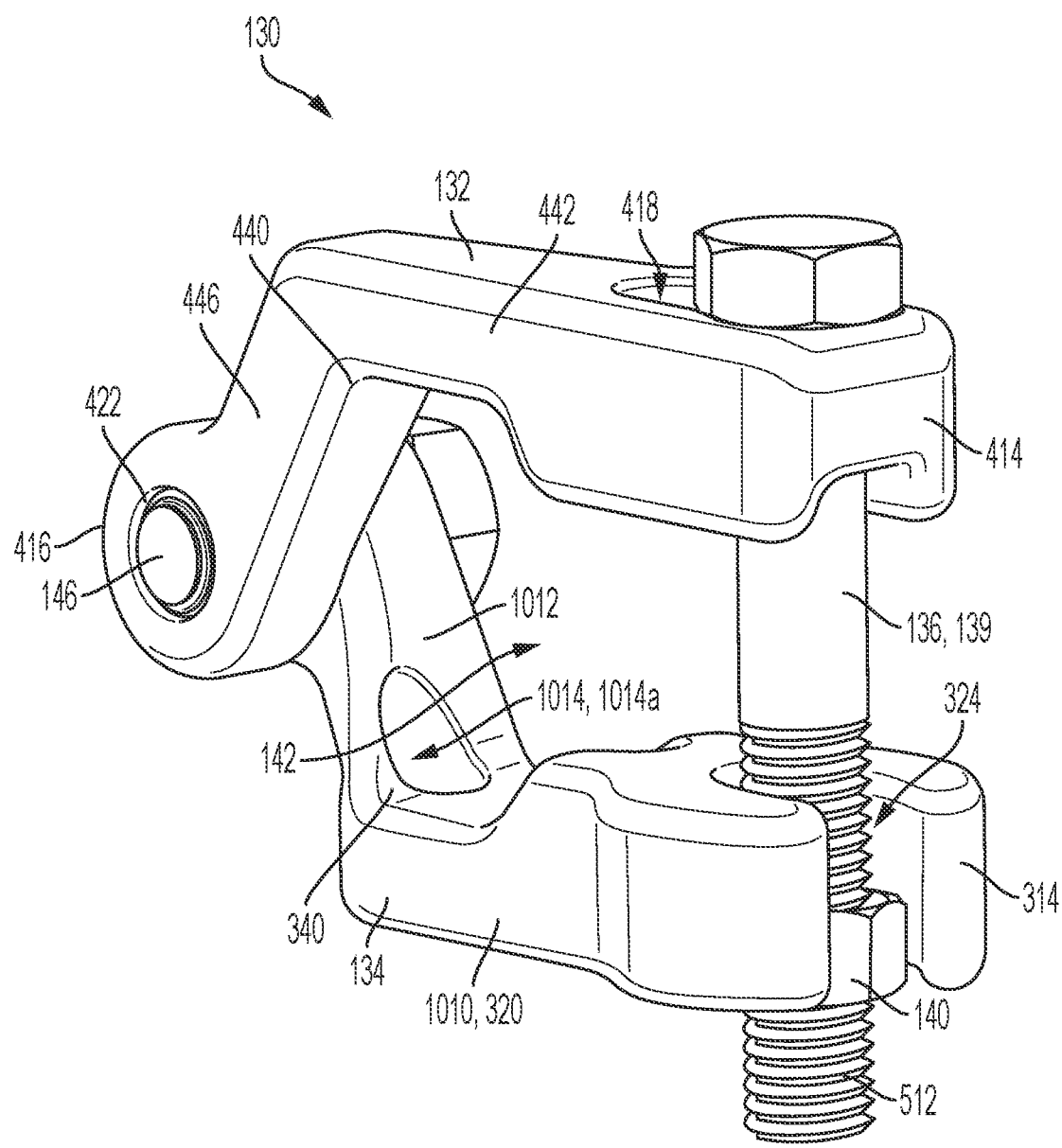
FIG. 10 is a perspective view of the brace clamp in the closed configuration, in accordance with another aspect of the present disclosure.

FIG. 10 illustrates one of the brace clamps 130 according to another example aspect of the present disclosure. As shown, the brace clamp 130 can comprise the upper jaw 132 and the lower jaw 134. The upper jaw 132 can be substantially similar to the upper jaw 132 previously described. For example, the upper jaw 132 can define the fastener opening 418 through which the clamp fastener 136 can be received, the upper hinge opening 422 (shown in FIG. 4) through which the hinge pin 146 can be received, and the upper notch 440 partially defining the clamp channel 142. The clamp fastener 136 can be the hex bolt 139. The upper jaw 132 may or may not define the fastener notches 420 (shown in FIG. 4) or the fastener recess 910 (shown in FIG. 9). Moreover, the upper jaw 132 can be substantially V-shaped in the present aspect. As shown, the upper jaw 132 can comprise the first portion 442 and the second portion 446 disposed at an angle relative to the first portion 442 to define the upper notch 440 therebetween. The fastener opening 418 can be defined through the first portion 442 proximate to the front jaw end 414, and the upper hinge opening 422 can be defined through the second portion 446 proximate to the rear jaw end 416.

Example aspects of the lower jaw 134 can also be substantially V-shaped. The lower jaw 134 can define the base 320, which can be considered a first portion 1010, and the base 320 can define the fastener slot 324 at the front jaw end 314. Instead of the jaw sidewalls 334 (shown in FIG. 3), the lower jaw 134 can define a second portion 1012 extending substantially rearward and upward from the base 320, relative to the orientation shown. The lower notch 340 can be defined between the base 320 and the second portion 1012 of the lower jaw 134. A single one of the lower hinge openings 336 (shown in FIG. 11) can be formed through the second portion 1012 proximate to the rear jaw end 316 (shown in FIG. 11). In some aspects, one or more relief openings 1014 can be formed through the lower jaw 134 and/or the upper jaw 132 to facilitate the lower jaw 134 and/or the upper jaw 132 flexing slightly around the sway brace pipe 830 (shown in FIG. 8) in the engaged configuration. For example, a first relief opening 1014a can be defined through the lower jaw 134 at the junction between the base 320 and the second portion 1012, and a second relief opening 1014b (shown in FIG. 11) can be defined through the lower jaw 134 between the first relief opening 1014a and the fastener slot 324.

Figure 11:
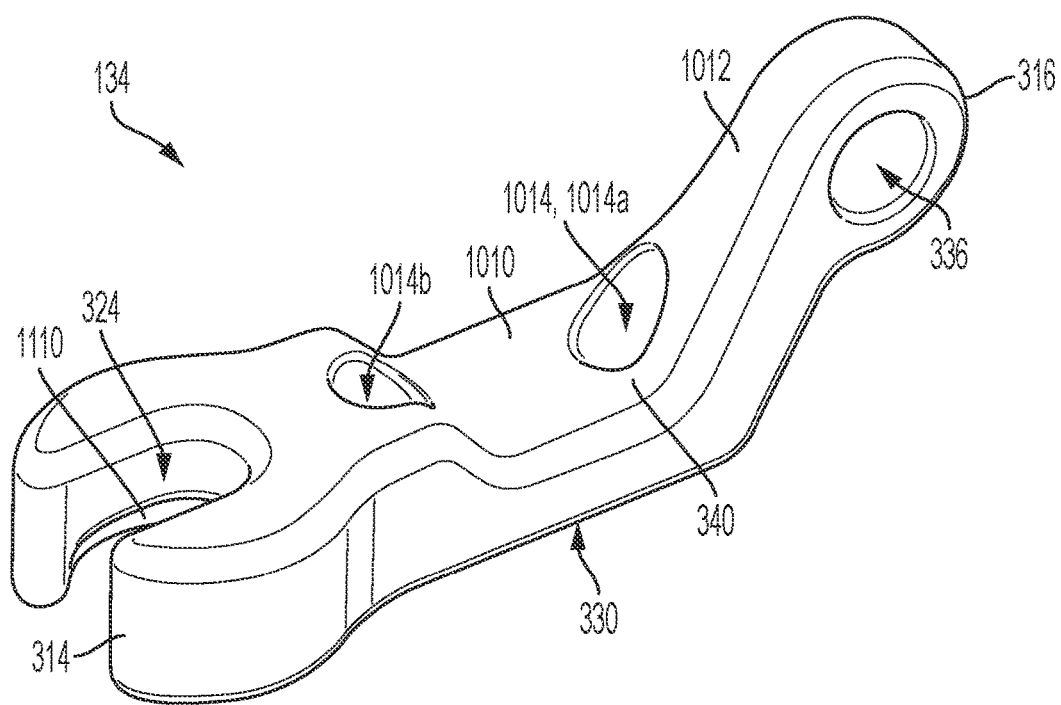
FIG. 11 is a perspective view of the lower jaw of the brace clamp of FIG. 10.
Figure 12:
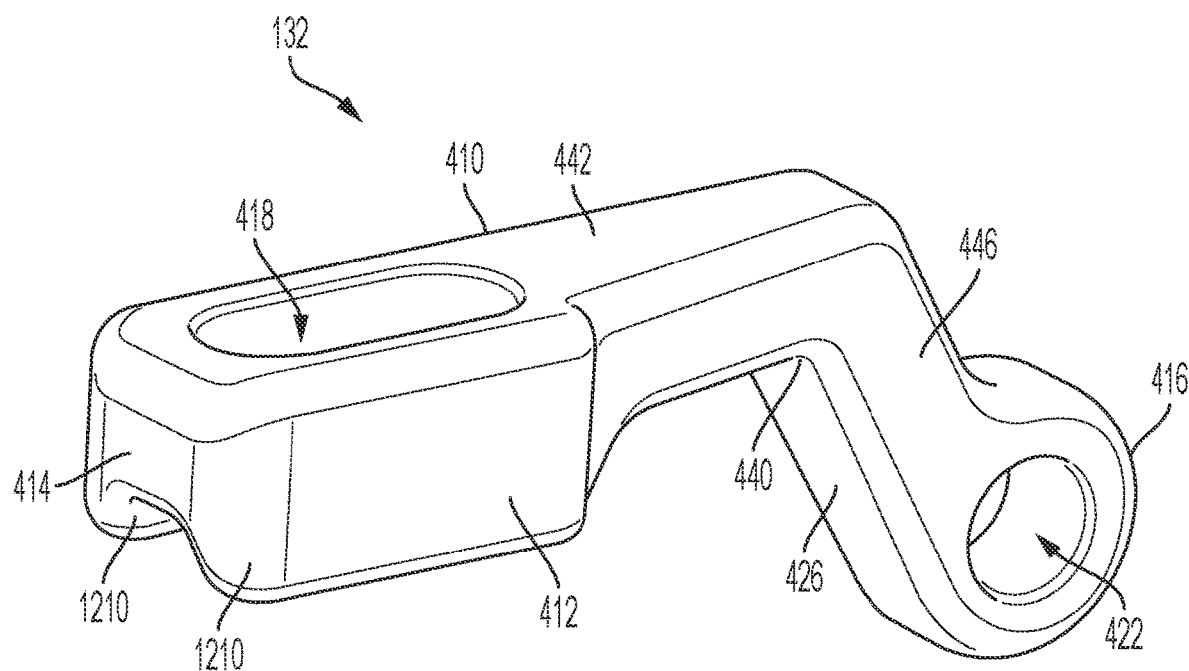
FIG. 12 is a perspective view of the upper jaw of the brace clamp of FIG. 10.

FIGS. 11 and 12 illustrate the lower jaw 134 and the upper jaw 132, respectively. Referring to FIG. 11, in example aspects, the lower jaw 134 can define a nut recess 1110 set into the lower base surface 330 and at least partially surrounding the fastener slot 324. The nut recess 1110 can be configured to receive the clamp nut 140 (shown in FIG. 10) therein in the engaged configuration. The nut recess 1110 can prevent or limit the clamp nut 140 from rotating on the threaded bolt shaft 512 (shown in FIG. 10) in the engaged configuration and thereby can prevent inadvertent loosening or tightening on the clamp nut 140, which can occur due to vibrations. FIG. 11 also illustrates the first and second relief openings 1014a,b formed through the lower jaw 134. Referring to FIG. 12, in some aspects, the upper jaw 132 can comprise a pair of fastener positioners 1210 extending from the lower jaw surface 426 of the upper jaw 132 at either side of the fastener opening 418. For example, a first one of the fastener positioners 1210 can be formed at or near the first jaw side 410 thereof, and a second one of the fastener positioners 1210 can be formed at or near the second jaw side 412 thereof.

Figure 13:
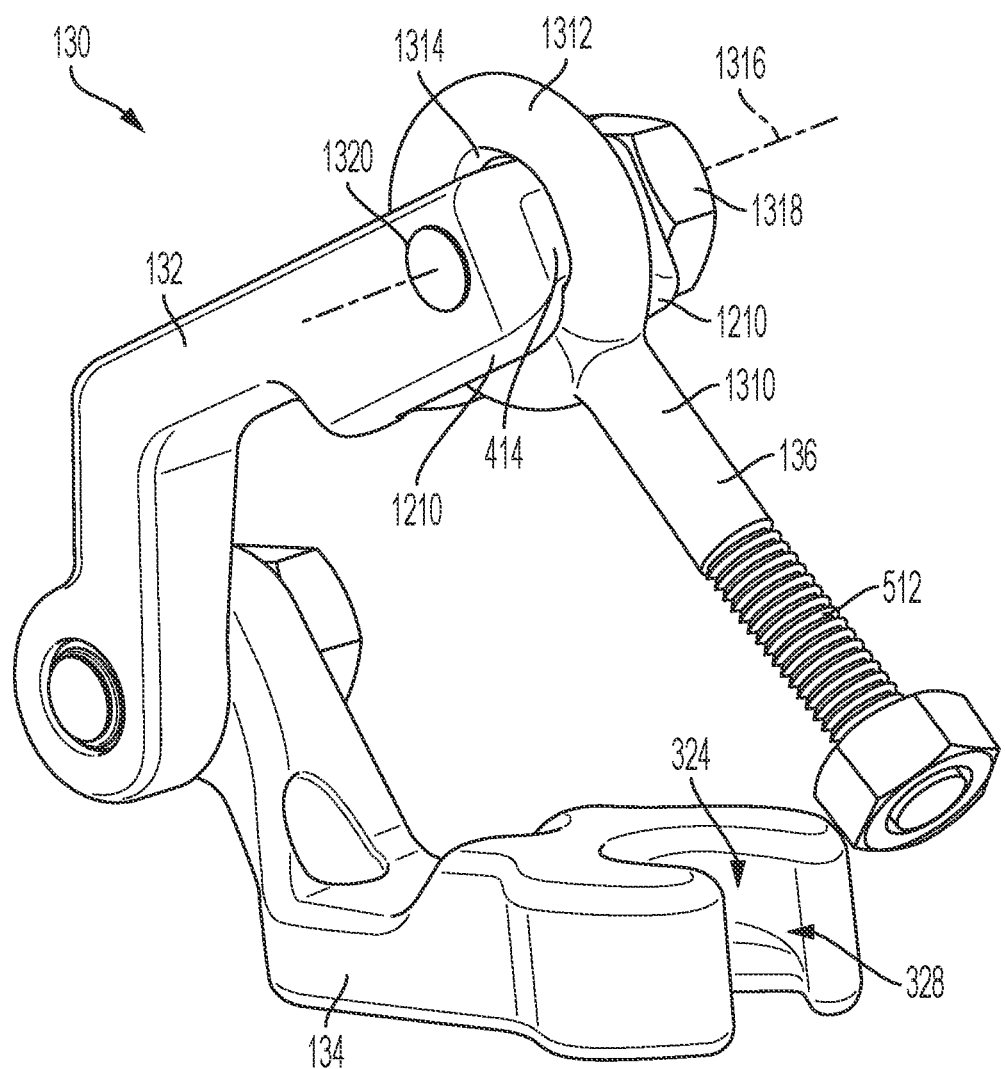
FIG. 13 is a perspective view of the brace clamp in the open configuration, in accordance with another aspect of the disclosure.

FIG. 13 illustrates the brace clamp 130 comprising the upper jaw 132 and the lower jaw 134, and further comprising the clamp fastener 136, wherein the clamp fastener 136 can be an eye bolt 1310. In other aspects, the clamp fastener 136 can be any other suitable fastener known in the art. The eye bolt 1310 can comprise a substantially annular eye 1312 defining a bolt opening 1314 therethrough and can further comprise the threaded bolt shaft 512 extending from the annular eye 1312. The annular eye 1312 of the eye bolt 1310 can be looped through the fastener opening 418 (shown in FIG. 14) of the upper jaw 132, such that the front jaw end 414 can extend through the bolt opening 1314. The eye bolt 1310 can be configured to rotate relative to the upper jaw 132 about a substantially lateral eye axis 1316, which can facilitate swinging the threaded bolt shaft 512 into the fastener slot 324 of the lower jaw 134 through the open slot end 328. The fastener positioners 1210 of the upper jaw 132 can engage the annular eye 1312 at either side of the fastener opening 418 to maintain the alignment of the threaded bolt shaft 512 with the fastener slot 324 to further facilitate the engagement of the threaded bolt shaft 512 therewith. In some aspects, the fastener opening 418 can be formed as an open-ended upper fastener slot, like the fastener slot 324 of the lower jaw 134, to allow for easy insertion of the annular eye 1312 therein. In such aspects, a removable upper fastener 1318 can extend laterally through, or at least partially through, the upper jaw 132 and across the upper fastener slot, such that the upper fastener 1318 can be received laterally through the bolt opening 1314 of the annular eye 1312 to retain the annular eye 1312 within the open-ended upper fastener slot. For example, the upper fastener 1318 can extend through a pair of opposing lateral upper openings 1320 formed through the upper jaw 132 and across the upper fastener slot formed therebetween.

Figure 14:
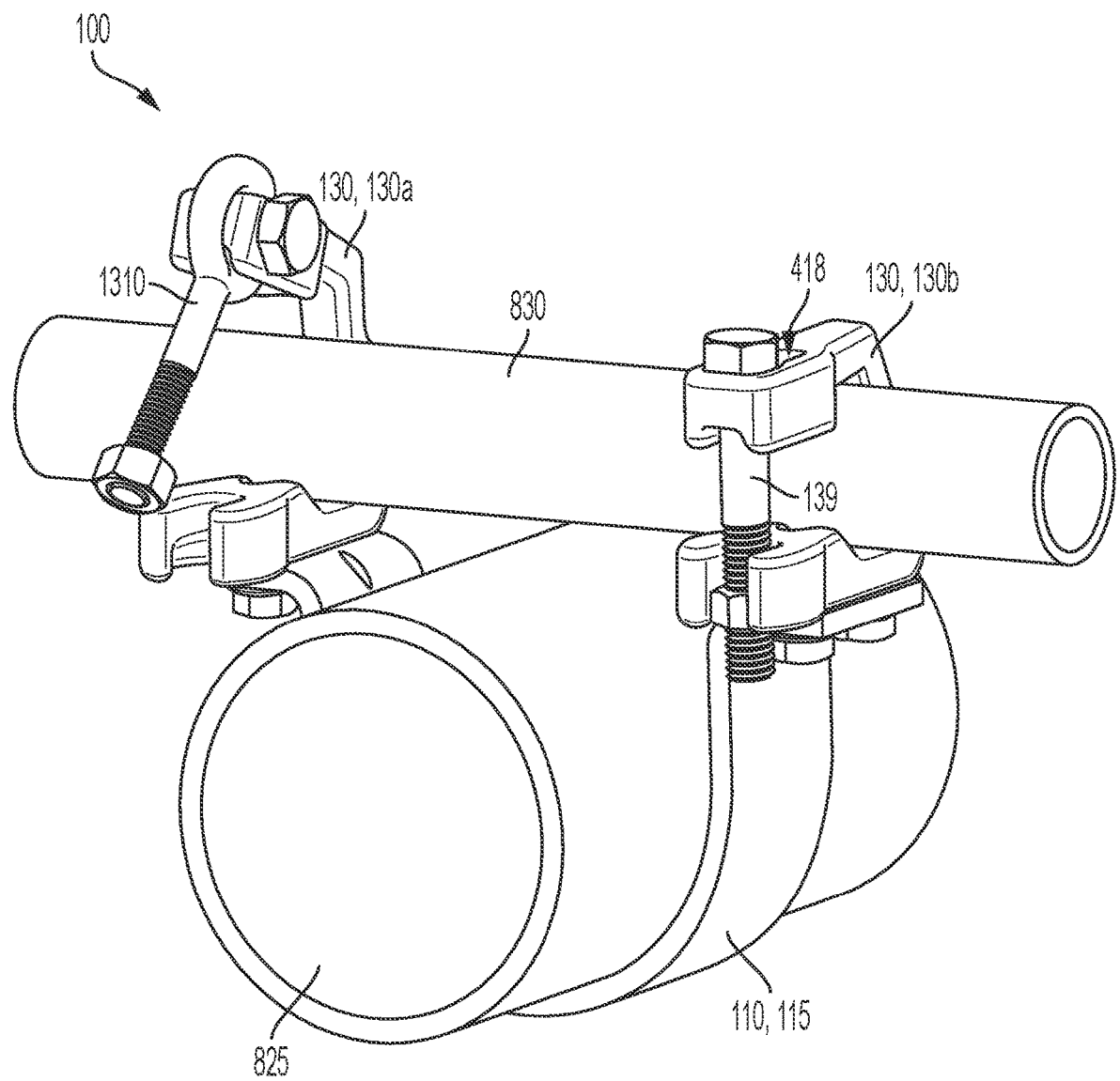
FIG. 14 is a perspective view of the sway brace fitting assembly being installed on the sway brace pipe and suspended pipe, in accordance with another aspect of the disclosure.

FIG. 14 illustrates the sway brace fitting assembly 100 in accordance with another aspect of the present disclosure. The sway brace fitting assembly 100 comprises the first brace clamp 130a, the second brace clamp 130b, and the pipe strap 110. The U-shaped strap body 115 of the pipe strap 110 can be configured to restrain the suspended pipe 825, and the first brace clamp 130a and second brace clamp 130b can be configured to engage the sway brace pipe 830. In the present aspect, the first brace clamp 130a can be the brace clamp 130 of FIG. 13 comprising the eye bolt 1310, and the second brace clamp 130b can be the brace clamp 130 of FIG. 10 comprising the hex bolt 139. The first brace clamp 130a is illustrated in the disengaged configuration, and the second brace clamp 130b is illustrated in the engaged configuration. In other aspects, both of the first and second brace clamps 130a,b can be the brace clamp 130 of FIG. 10, and in other aspects, both of the first and second brace clamps 130a,b can be the brace clamp 130 of FIG. 13.

Figure 15:
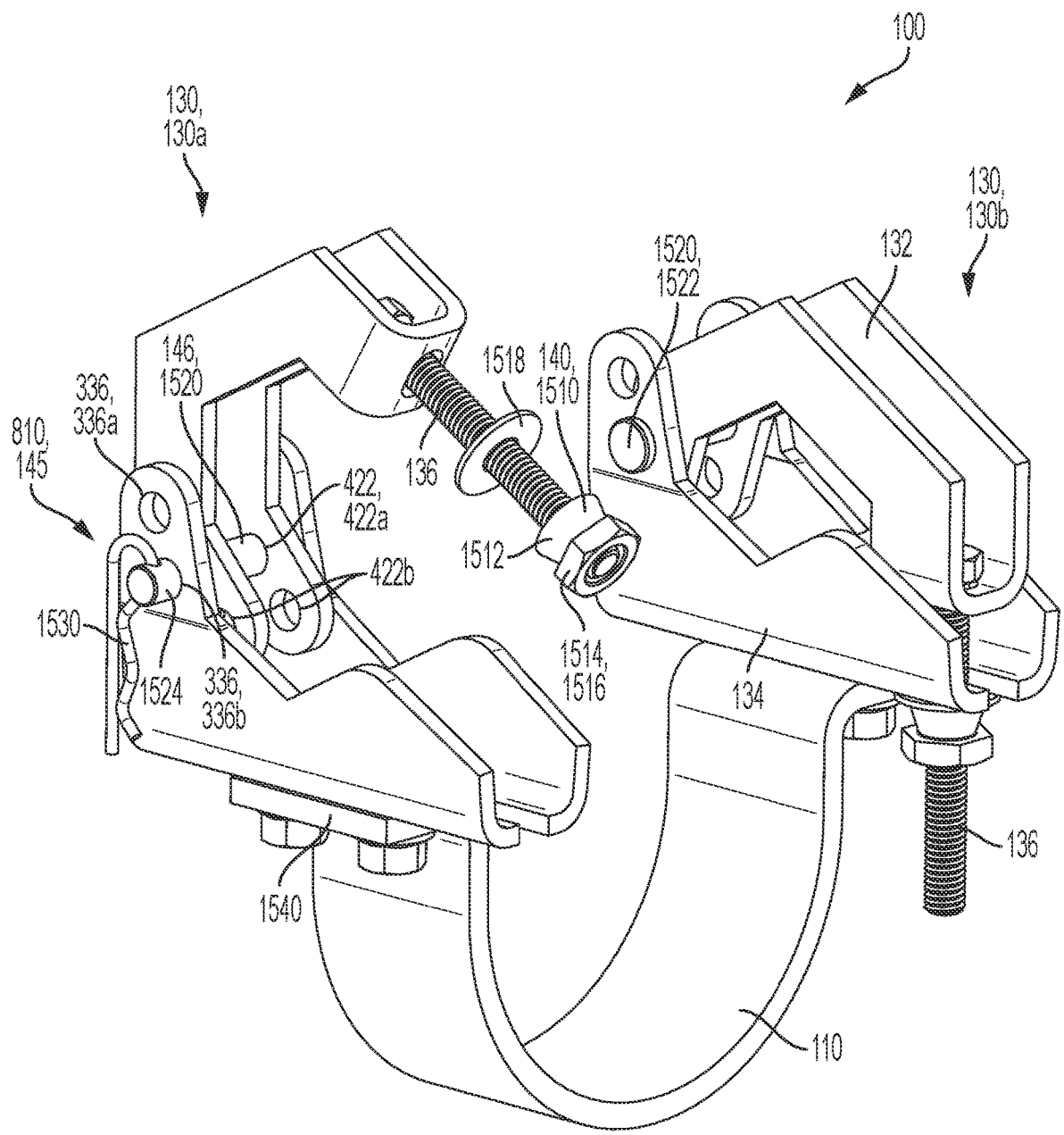
FIG. 15 is a perspective view of the sway brace fitting assembly in accordance with another aspect of the present disclosure.

FIG. 15 illustrates a perspective view of the sway brace fitting assembly 100 according to another example aspect. The sway brace fitting assembly 100 can comprise the pipe strap 110, the first brace clamp 130a, and the second brace clamp 130b. In the present view, the first brace clamp 130a is oriented in the disengaged configuration (i.e., the open configuration), and the second brace clamp 130b is oriented in the engaged configured (i.e., the closed configuration). Each of the first and second brace clamps 130a,b can comprise the upper jaw 132, the lower jaw 134, and the clamp fastener 136. In the present aspect, the clamp nut 140 mounted on the clamp fastener 136 can be a flanged torque-off nut 1510 comprising a flange nut portion 1512 and a break-off nut portion 1514. The break-off nut portion 1514 can be in the form of a hex nut 1516 in some aspects, as shown. The break-off nut portion 1514 can be engaged by a tool, such as a wrench, when tightening the flanged torque-off nut 1510 on the distal shaft end 514 of the clamp fastener 136, and the break-off nut portion 1514 can break away from the flange nut portion 1512 when tightened to a suitable torque. Additionally, in some aspects, a washer 1518 can be disposed on the threaded bolt shaft 512, which can be sandwiched between the clamp nut 140 and the lower jaw 134 in the engaged configuration.

Both the upper jaw 132 and the lower jaw 134 can be formed from sheet metal in the present aspect. As described above, other aspects of the brace clamps 130 can comprise any other suitable material. The upper jaw 132 can be pivotably coupled to the lower jaw 134 by the hinge 145. In the present aspect, the hinge 145 can be the multi-position hinge 810. The lower hinge openings 336 can comprise the first pair 336a and the second pair 336b of the lower hinge openings 336, and the upper hinge openings 422 can comprise a first pair 422a and a second pair 422b of the upper hinge openings 422.

Example aspects of the hinge 145 can comprise the hinge pin 146. In the present aspect, the hinge pin 146 can comprise a clevis pin 1520, which can be secured in position by a cotter pin 1530. The clevis pin 1520 can extend through a corresponding pair of the lower hinge openings 336 and a corresponding pair of the upper hinge openings 422. A pin head 1522 of the clevis pin 1520 can be sized to prohibit the pin head 1522 from passing through the lower hinge openings 336 and the upper hinge openings 422 in a first direction. The cotter pin 1530 can be coupled to the clevis pin 1520 at a distal pin end 1524 thereof, opposite the pin head 1522, and the cotter pin 1530 can prevent the distal pin end 1524 of the clevis pin 1520 from passing through the lower hinge openings 336 and the upper hinge openings 422 in an opposite second direction. The clevis pin 1520 can thereby be secured to the corresponding brace clamp 130. In some aspects, the clevis pin 1520 can engage the cotter pin 1530 at a middle bump (generally at 1530) thereof.

Figure 16:
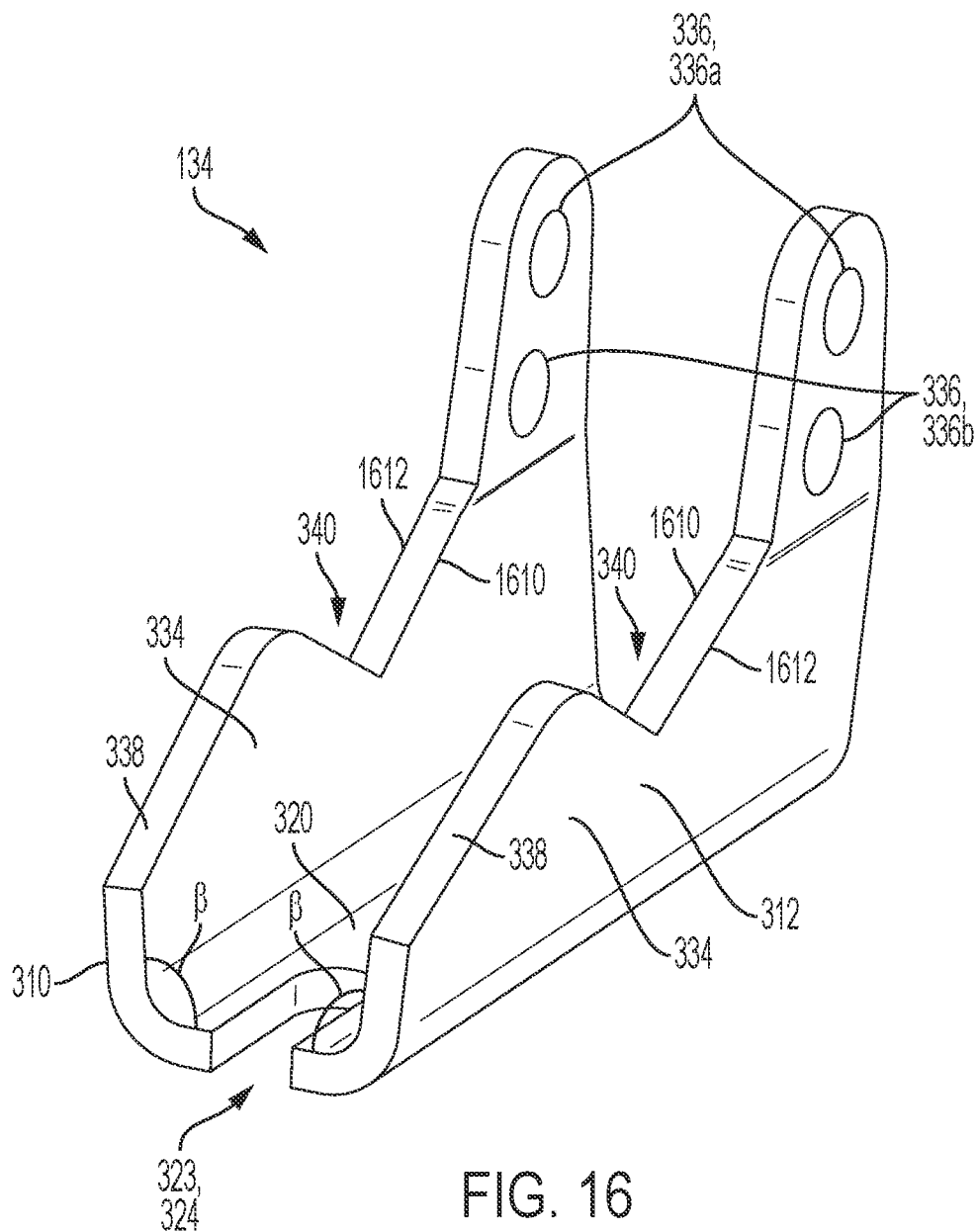
FIG. 16 is perspective view of the lower jaw of the sway brace fitting assembly of FIG. 15.

FIG. 16 illustrates an example aspect of the lower jaw 134. The lower jaw 134 can comprise the base 320 and the pair of jaw sidewalls 334 extending upward from the base 320 relative to the orientation shown. The base 320 can define the fastener aperture 323, which can be the fastener slot 324 in the present aspect. A first one of the jaw sidewalls 334 can extend from the base 320 at the first jaw side 310, and a second one of the jaw sidewalls 334 can extend from the base 320 at the second jaw side 312. The jaw sidewalls 334 can define the first pair 336a and the second pair 336b the lower hinge openings 336. The upper wall end 338 of each jaw sidewall 334 can define an inner wall edge 1610 and an outer wall edge 1612. In the present aspect, each of the jaw sidewalls 344 can be angled slightly outward and away from one another. Thus, each of the jaw sidewalls can define an angle R relative to the base 320 that can be greater than 90° (i.e., obtuse). In other aspects, however, the angle R can be about 90°.

Figure 17:
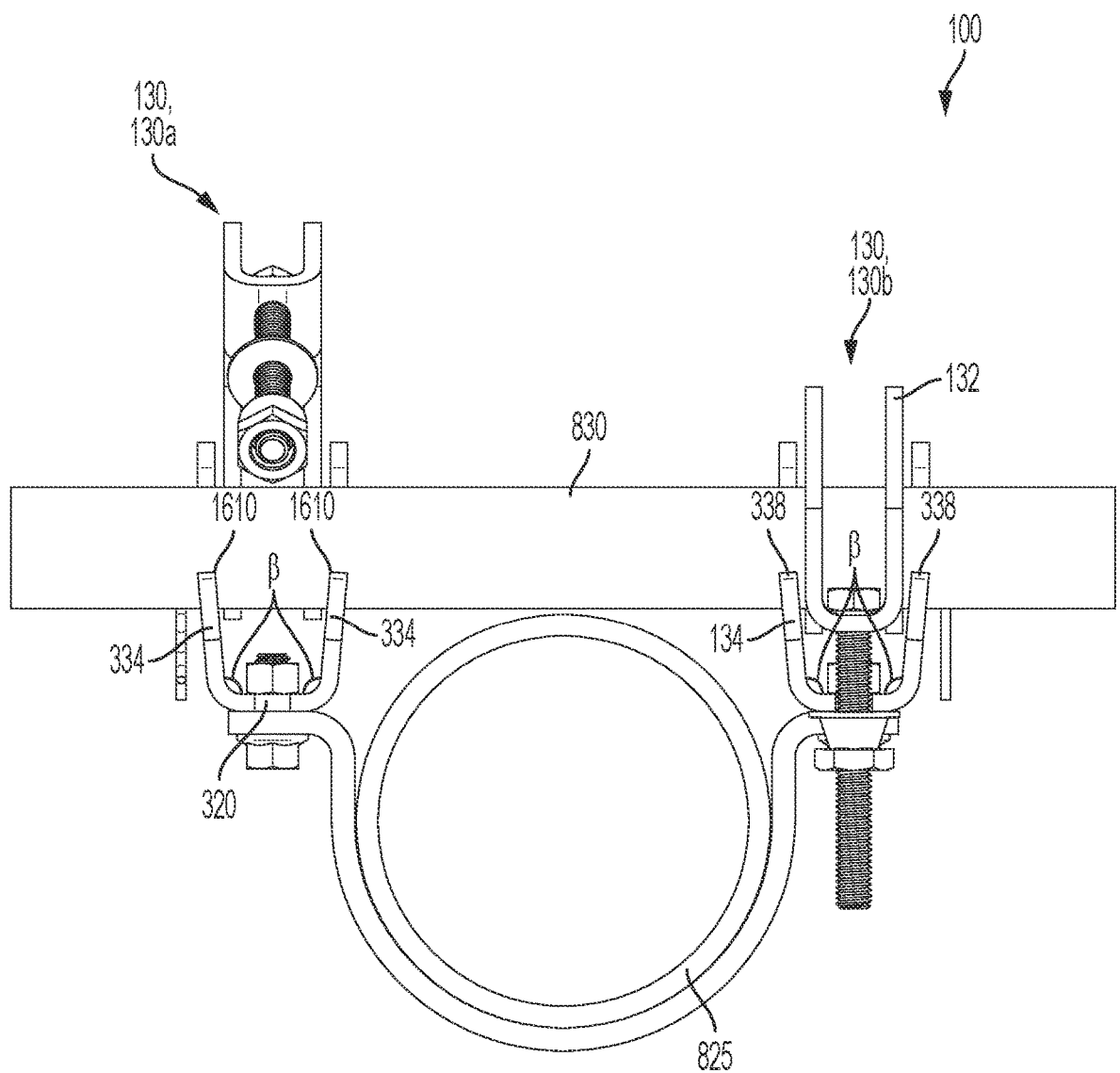
FIG. 17 is a front view of the sway brace fitting assembly of FIG. 15 being installed on the sway brace pipe and suspended pipe.

FIG. 17 illustrates the sway brace fitting assembly 100 being installed on the sway brace pipe 830 and suspended pipe 825. As shown, the sway brace pipe 830 can be clamped between the upper jaw 132 and the lower jaw 134 of each brace clamp 130. The lower jaw 134 can engage the sway brace pipe 830 at the upper wall end 338 of the jaw sidewalls 344. Due to the outward angle R of each jaw sidewall 334 relative to the corresponding base 320, the inner wall edge 1610 of each jaw sidewall 334 can contact and bite into the sway brace pipe 830 for an improved grip on the sway brace pipe 830. Additionally, the outward angle R of each jaw sidewall 334 can allow for a portion of the lateral load of the sway brace pipe 830 to be re-directed against the jaw sidewalls 334.

Figure 18:
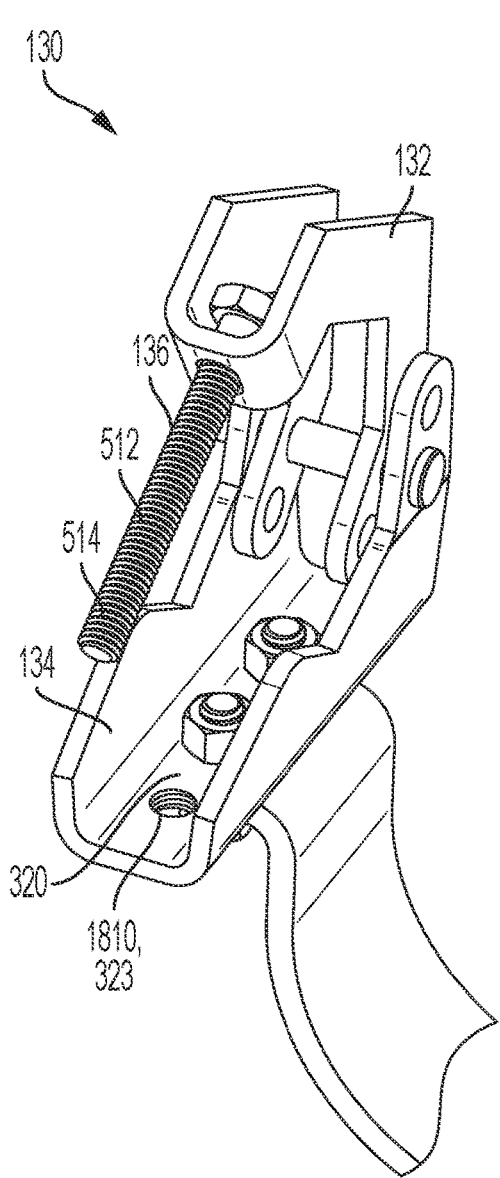
FIG. 18 is a perspective view of the brace clamp in accordance with another aspect of the present disclosure.

FIG. 18 illustrates one of the brace clamps 130 in accordance with another aspect of the present disclosure. The brace clamp 130 can comprise the upper jaw 132, the lower jaw 134, and the clamp fastener 136. In the present aspect, the fastener aperture 323 formed in the base 320 of the lower jaw 134 can be the threaded fastener hole 1810. The clamp fastener 136 can be coupled to the lower jaw 134 by engaging the distal shaft end 514 of the threaded bolt shaft 512 with the threaded fastener hole 1810 and rotating the threaded bolt shaft 512 therein to tighten the clamp fastener 136 in the engaged configuration.

Figure 19:
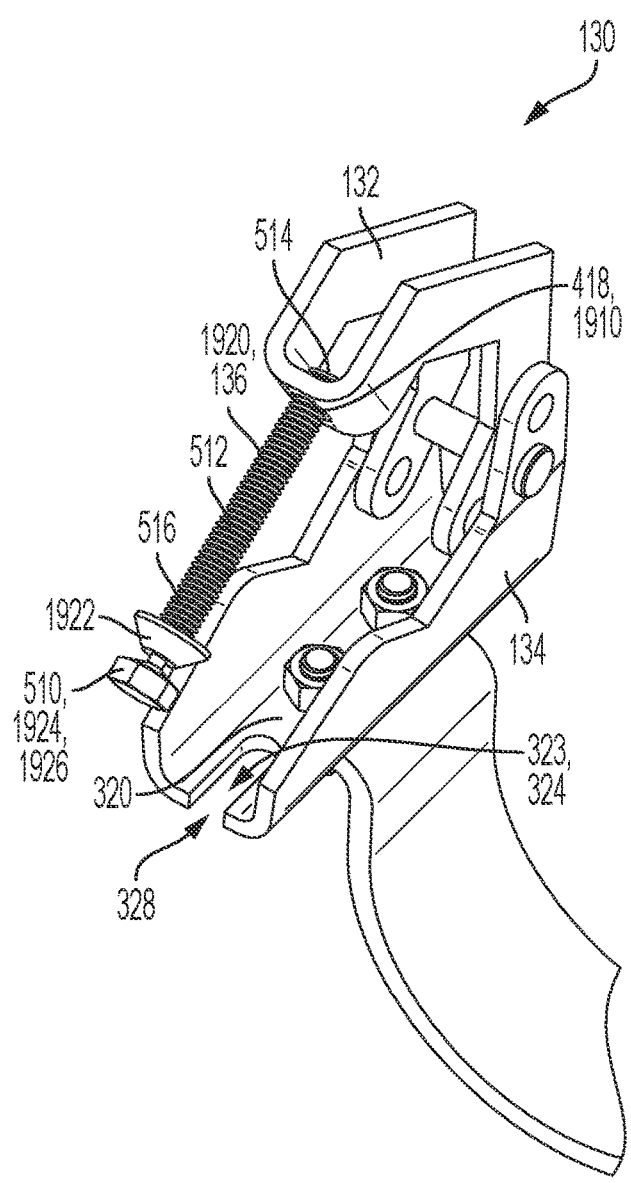
FIG. 19 is a perspective view of the brace clamp in accordance with another aspect of the present disclosure.

FIG. 19 illustrates one of the brace clamps 130 in accordance with another aspect of the present disclosure. The brace clamp 130 can comprise the upper jaw 132, the lower jaw 134, and the clamp fastener 136. The fastener aperture 323 formed in the base 320 of the lower jaw 134 can be the fastener slot 324. In the present aspect, the fastener opening 418 of the upper jaw 132 can be a threaded fastener opening 1910. The clamp fastener 136 can be a flanged torque-off bolt 1920. Similar to the threaded clamp bolt 138 (shown in FIG. 1) previously described, the flanged torque-off bolt 1920 can comprise the threaded bolt shaft 512 and the bolt head 510 coupled to the threaded bolt shaft 512 at the proximal shaft end 516. However, in the present aspect, the bolt head 510 can comprise a flange head portion 1922 and a break-off head portion 1924. The break-off head portion 1924 can be in the form of a hex head 1926 in some aspects, as shown.

The distal shaft end 514 of the threaded bolt shaft 512 can be pre-engaged with the threaded fastener opening 1910 of the upper jaw 132, as shown. The flanged torque-off bolt 1920 can be coupled to the lower jaw 134 by swinging the proximal shaft end 512 into the fastener slot 324 through the open slot end 328 and then rotating the threaded bolt shaft 512 within the threaded fastener opening 1910 to tighten the flanged torque-off bolt 1920 in the engaged configuration. To rotate the threaded bolt shaft 512 within the threaded fastener opening 1910, the break-off head portion 1924 of the bolt head 510 can be engaged and rotated by a tool, such as a wrench. Once the flanged torque-off bolt 1920 has been tightened to a suitable torque for properly clamping the brace clamp 130 around the sway brace pipe 830 (shown in FIG. 8), the break-off head portion 1924 of the bolt head 510 can break away from the flange head portion 1922 of the bolt head 510.

Figure 20:
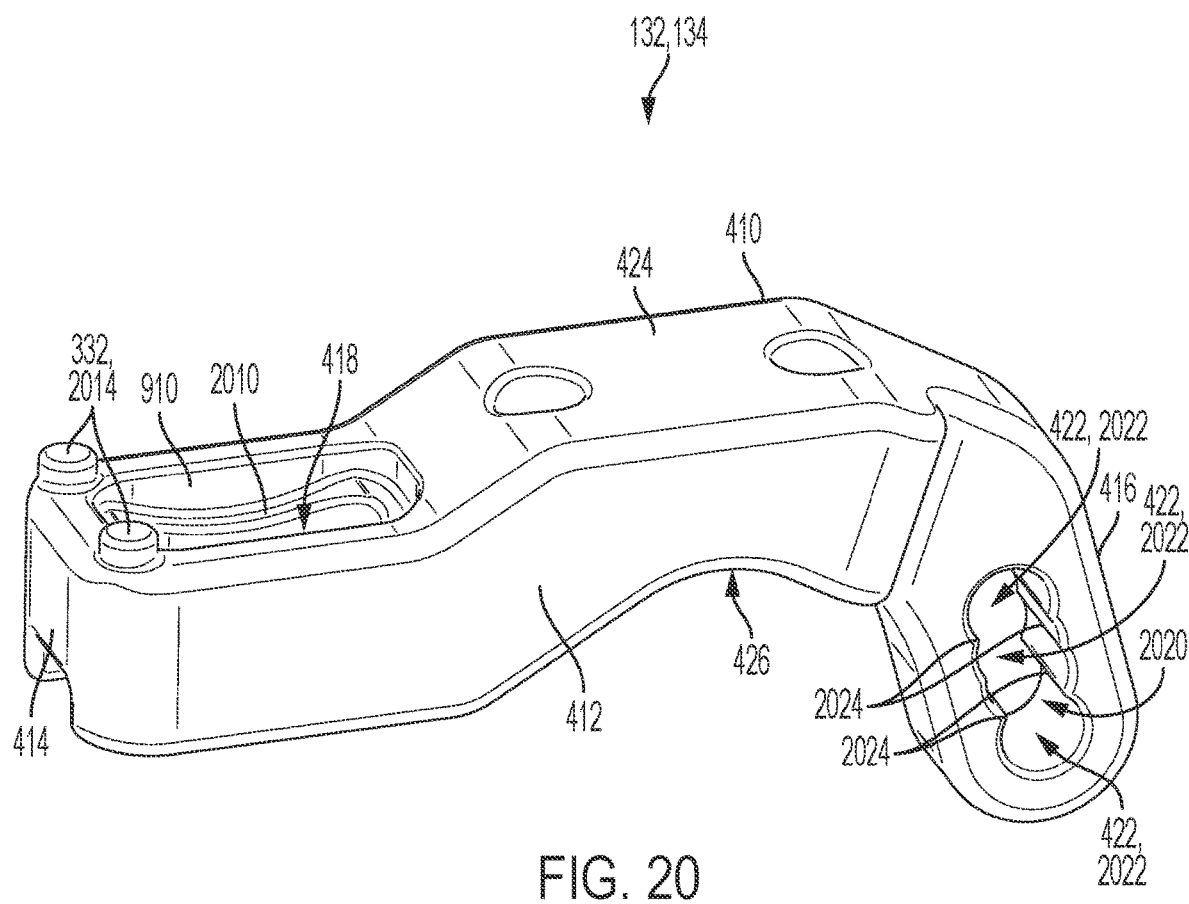
FIG. 20 is a perspective view of the upper jaw in accordance with another aspect of the present disclosure.

FIG. 20 illustrates the upper jaw 132 and/or the lower jaw 134, in accordance with another example aspect of the present disclosure. That is, the jaw style shown in FIG. 20 can serve as the upper jaw 132, the lower jaw 134, or both the upper and lower jaws 132,134. In some aspects, the upper jaw 132 and the lower jaw 134 can be cast or otherwise manufactured as identical parts. For the sake of simplicity, the jaw shown in FIG. 20 is described as the upper jaw 132, but the same description could alternatively or also apply to the lower jaw 134.

The upper jaw 132 can define the fastener opening 418, which can be defined longitudinally through the upper jaw 132 proximate to the front jaw end 414. The circumferential fastener recess 910 can be set into the upper jaw surface 424 and can surround the fastener opening 418. In example aspects, the fastener recess 910 can define a first recess shoulder 2010 proximate to the first jaw side 410 and a second recess shoulder 2212 (shown in FIG. 22) proximate to the second jaw side 412. Each of the first recess shoulder 2010 and the second recess shoulder 2212 can be substantially concave in the present aspect. That is, each of the first recess shoulder 2010 and the second recess shoulder 2212 can arc downward towards the lower jaw surface 426 of the upper jaw 132. The first and second recess shoulders 2010, 2212 are shown and described in further detail with respect to FIGS. 21 and 22.

In some aspects, the upper jaw 132 can define a pair of jaw tabs 2014 extending upward from the upper jaw surface 424 at the front jaw end 414. A first one of the jaw tabs 2014 can be disposed generally at or adjacent to the first jaw side 410, and a second one of the jaw tabs 2014 can be disposed generally at or adjacent to the second jaw side 412. In aspects wherein the orientation of the clamp fastener 136 is reversed or wherein the present jaw style serves as the lower jaw 134, the jaw tabs 2014 can function as the positioner tabs 332 to engage the clamp nut 140 (shown in FIG. 1).

The upper jaw 132 can further define a plurality of the upper hinge openings 422 proximate to the rear jaw end 416. In the present aspect, the plurality of upper hinge openings 422 can be interconnected in series to define one large hinge aperture 2020 having a plurality of hinge sections 2022, wherein each of the hinge sections 2022 can correspond to one of the upper hinge openings 422. Internal ridges 2024 can extend into the hinge aperture 2020 between each of the upper hinge openings 422 to define the distinct hinge sections 2022 and to retain the hinge pin 146 (shown in FIG. 1) in the desired upper hinge opening 422.

Figure 21:
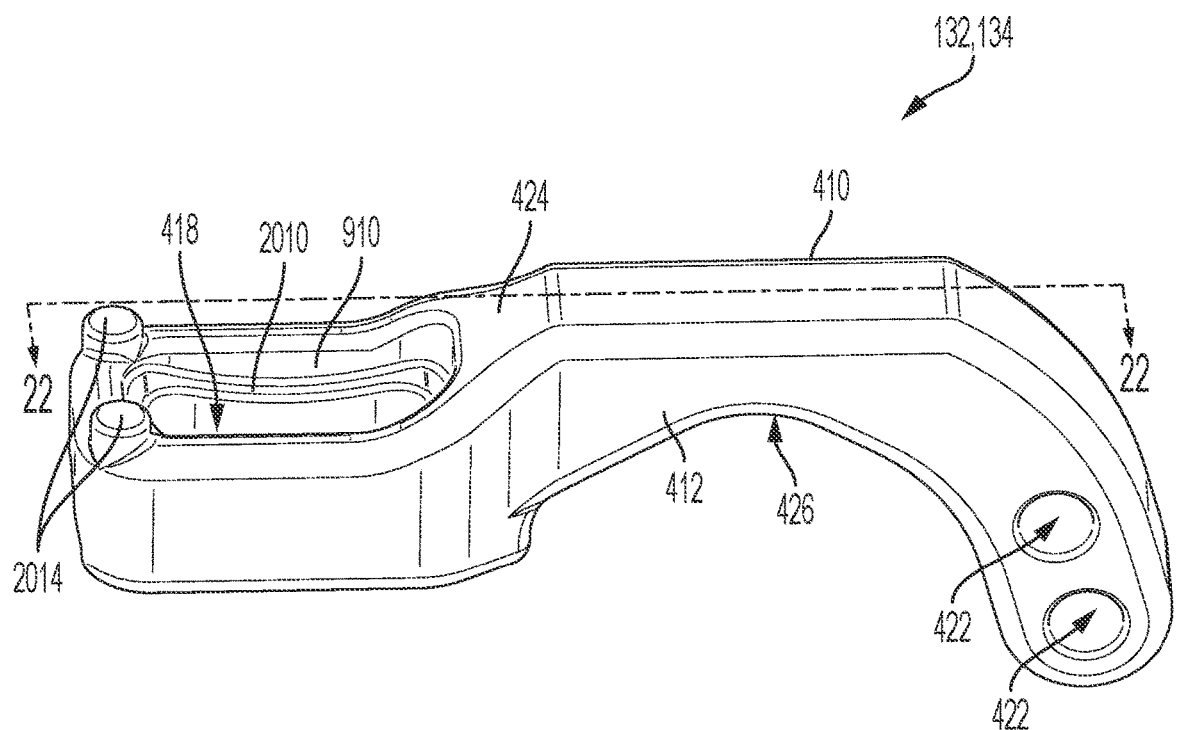
FIG. 21 is a perspective view of the upper jaw in accordance with another aspect of the present disclosure.
Figure 22:
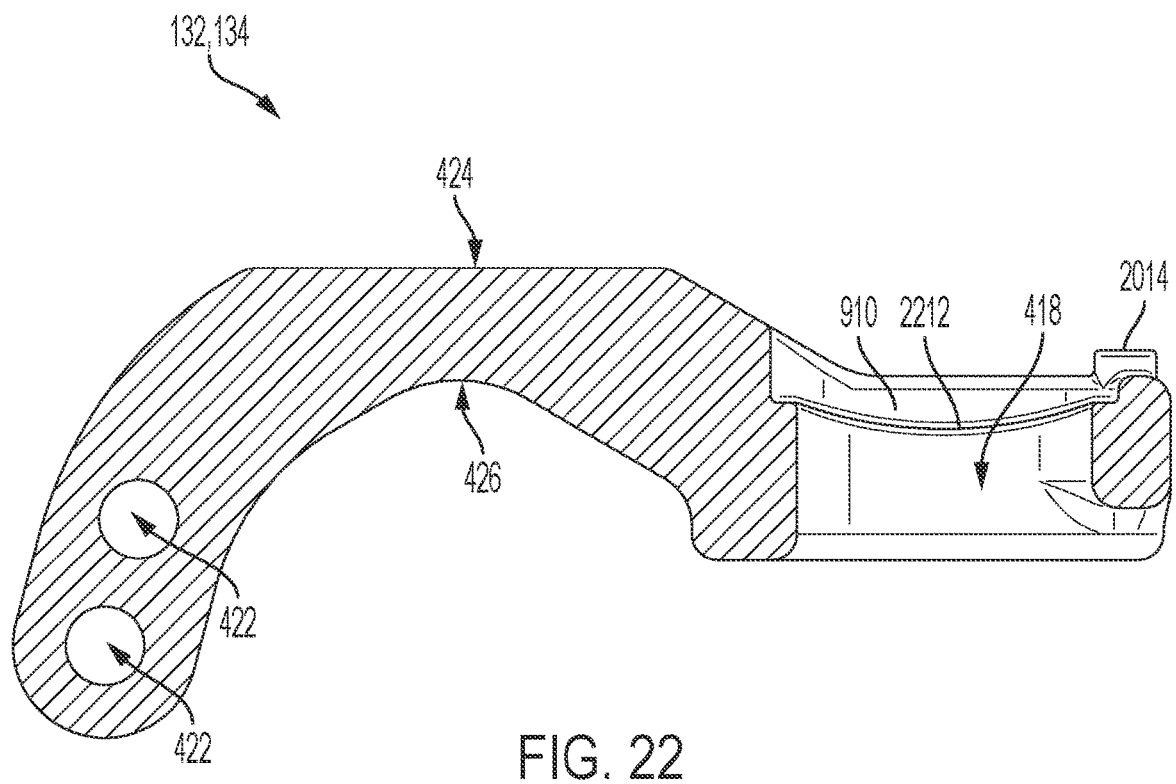
FIG. 22 is a cross-sectional view of the upper jaw taken along line 22-22 in FIG. 21.

FIG. 21 illustrates a perspective view of the upper jaw 132 and/or the lower jaw 134 in accordance with another example aspect of the present disclosure, and FIG. 22 is a cross-sectional view of the upper jaw 132 and/or the lower jaw 134 taken along line 22-22 in FIG. 21. That is, the jaw style shown in FIGS. 21 and 22 can serve as the upper jaw 132, the lower jaw 134, or both the upper and lower jaws 132,134. In some aspects, the upper jaw 132 and the lower jaw 134 can be cast or otherwise manufactured as identical parts. For the sake of simplicity, the jaw shown in FIGS. 21 and 22 is described as the upper jaw 132, but the same description could alternatively or also apply to the lower jaw 134.

The upper jaw 132 of the present aspect can define the substantially concave first recess shoulder 2010 and the substantially concave second recess shoulder 2212 (shown in FIG. 22). According to example aspects, the first and second recess shoulders 2010,2212 can be configured to engage the bolt head 510 (shown in FIG. 5) of the threaded clamp bolt 138 (shown in FIG. 1) in the engaged configuration, and the concavity of the first and second recess shoulders 2010,2212 can help center the bolt head 510 within fastener recess 910 and prevent sliding or movement of the bolt head 510 therein.

Figure 23:
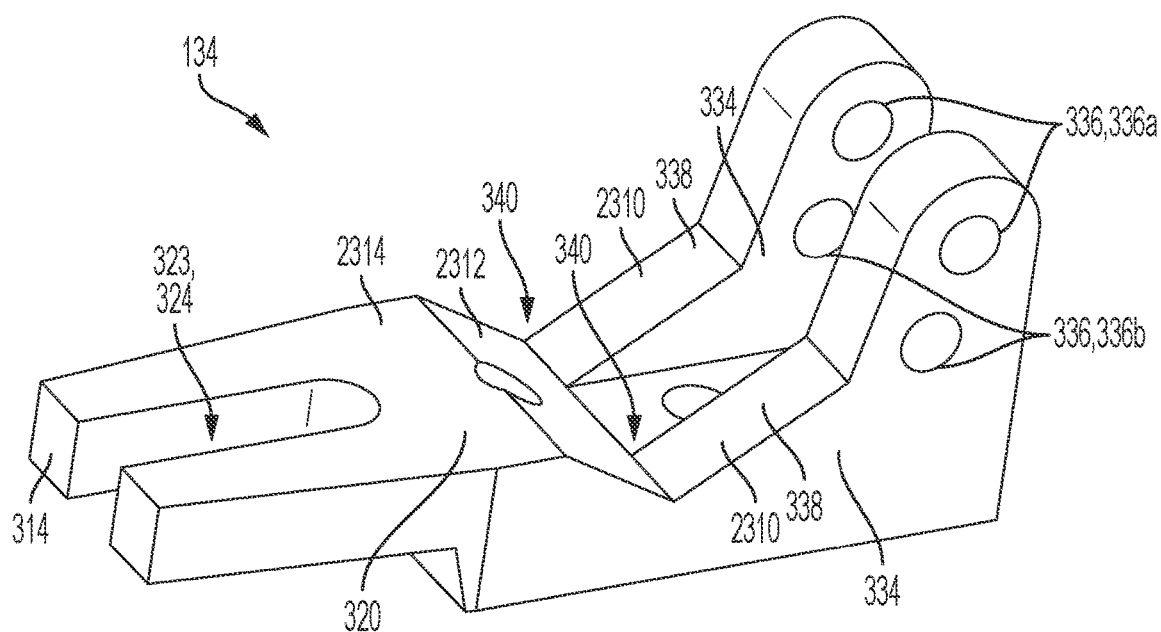
FIG. 23 is top perspective view of the lower jaw in accordance with another aspect of the present disclosure.
Figure 24:
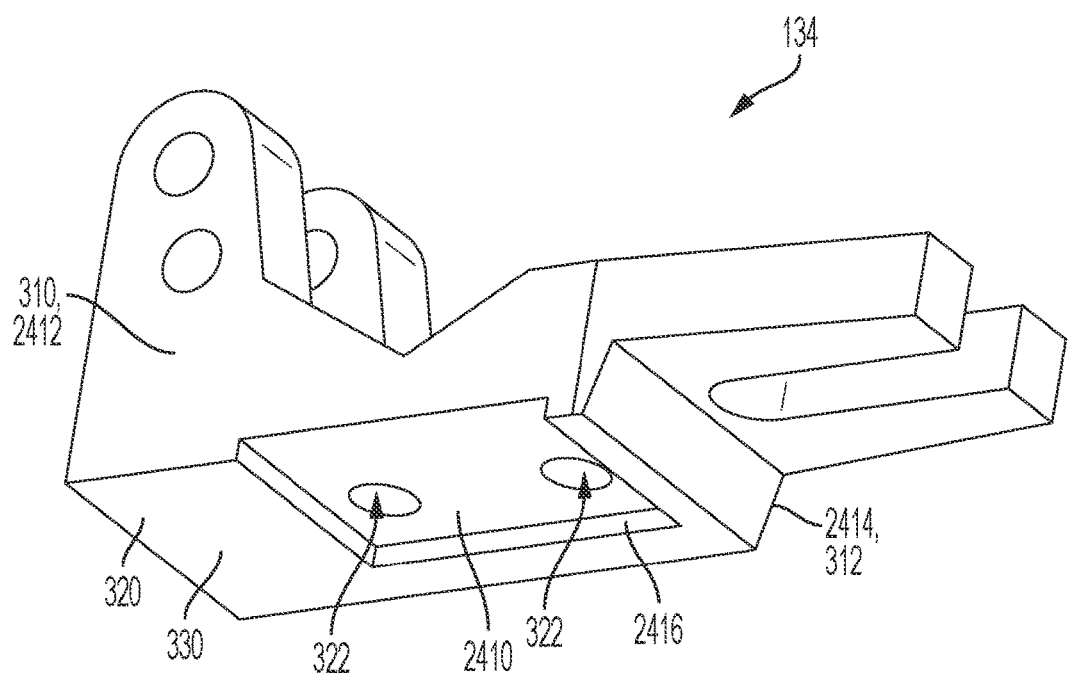
FIG. 24 is bottom perspective view of the lower jaw of FIG. 23.

FIGS. 23 and 24 illustrate top and bottom perspective views, respectively, of the lower jaw 134 according to another example aspect. Specifically, the lower jaw 134 of the second brace clamp 130*b* (shown in FIG. 1) is illustrated, which can be attached to the second strap mount 124*b* at the second side 114 of the pipe strap 110 (110, 114, and 124*b* shown in FIG. 1). The lower jaw 134 can comprise the base 320 and the pair of jaw sidewalls 334 extending upward from the base 320 relative to the orientation shown. The base 320 can define the fastener aperture 323 at the front jaw end 314, which can be the fastener slot 324 in the present aspect. The jaw sidewalls 334 can define the first pair 336*a* and the second pair 336*b* the lower hinge openings 336. In the present aspect, the upper wall end 338 of each jaw sidewall 334 define a rear notch portion 2310 of each lower notch 340 and an upper base surface 2314 of the base 320 can define a front notch portion 2312 of each lower notch 340.

Additionally, referring to FIG. 24, the lower base surface 330 of the base 320 can define a mount positioning groove 2410 formed therein. The mount positioning groove 2410 can extend from an inward-facing side 2412 of the lower jaw 134 towards an opposite outward-facing side 2414 of the lower jaw 134. The mount positioning groove 2410 can terminate at a groove stop surface 2416 proximate to the outward-facing side 2414. As shown, the inward-facing side 2412 can be the first jaw side 310, and the outward-facing side 2414 can be the second jaw side 312 on the lower jaw 134 of the second brace clamp 130*b*. However, on the lower jaw 134 of the first brace clamp 130*a* (shown in FIG. 1), the inward-facing side 2412 can be the second jaw side 312 and the outward-facing side 2414 can be the first jaw side 310. According to example aspects, the mount positioning groove 2410 of the lower jaw 134 can be configured to receive the corresponding strap mount 124 (shown in FIG. 1) therein. An outward end 1540 (shown in FIG. 15) of the strap mount 124 can confront (and may abut) the groove stop surface 2416. The mount positioning groove 2410 can correctly position the brace clamp 130 on the corresponding strap mount 124 to locate the clamp mounting holes 322 of the lower jaw 134 in alignment with the strap mounting holes 234 (shown in FIG. 2) of the strap mount 124.

Figure 25:
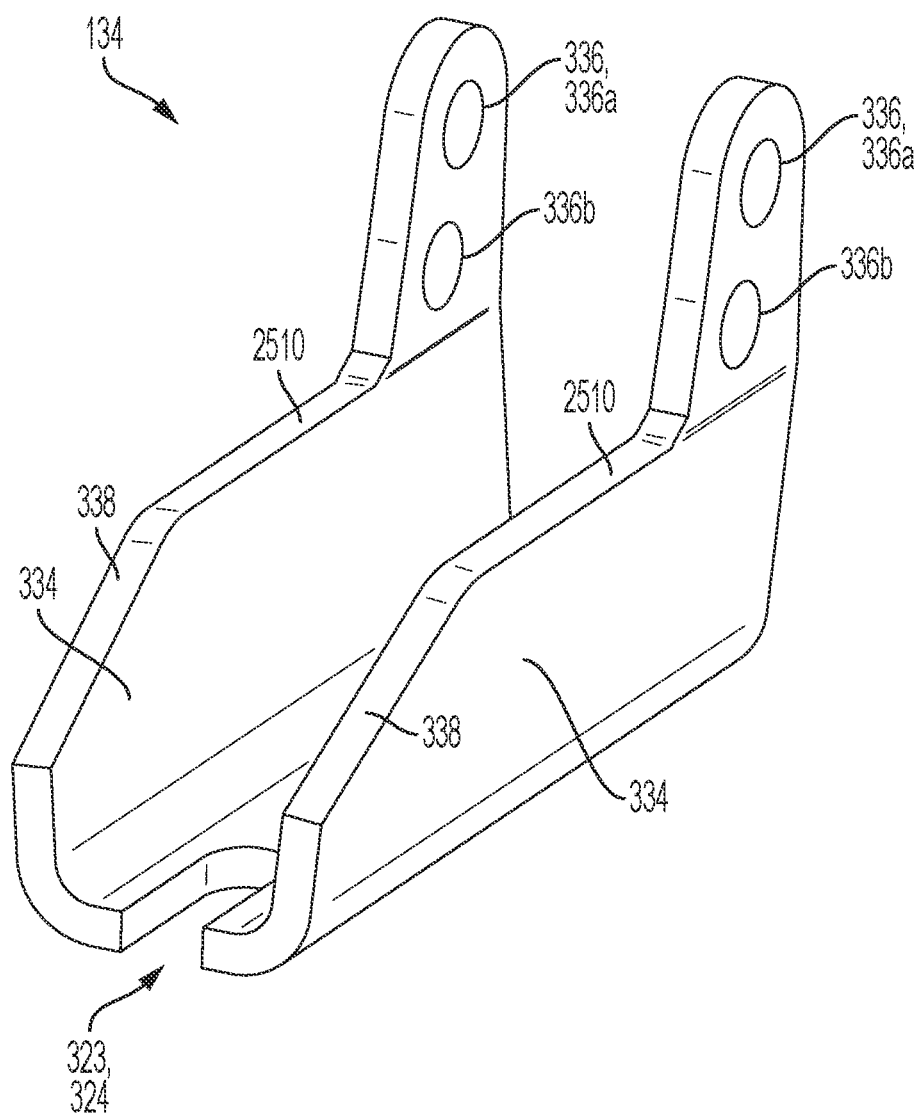
FIG. 25 is a perspective view of the lower jaw in accordance with another aspect of the present disclosure.

FIG. 25 illustrates the lower jaw 134 according to another aspect of the present disclosure. In the present aspect, instead of defining the lower notch 340 (shown in FIG. 3), the upper wall end 338 of each jaw sidewall 334 can define the substantially flat pipe engagement portion 2510 configured to engage the sway brace pipe 830 (shown in FIG. 8) in the engaged configuration. This substantially flap pipe engagement portions 2510 can allow sway brace pipes 830 of varying sizes (e.g., varying diameters) to sit at about the same distance from the suspended piping 820 (shown in FIG. 8). For example, a sway brace pipe 830 having a 1" diameter can sit at about the same distance from the suspended piping 820 as a sway brace pipe 830 having a 2" diameter.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A sway brace fitting assembly comprising:
a pipe strap comprising substantially U-shaped strap body configured to cradle a suspended pipe;
a sway brace pipe;
a brace clamp coupled to the pipe strap and comprising a first jaw and a second jaw, wherein a clamp channel is defined between the first jaw and the second jaw, the sway brace pipe received through the clamp channel; and
a clamp fastener coupled to the first jaw and comprising a bolt head configured to engage an upper jaw surface of the first jaw;
wherein:
the brace clamp is configurable in a disengaged configuration, wherein the first jaw is pivoted away from the second jaw and the brace clamp is unattached to the sway brace pipe, and an engaged configuration, wherein the first jaw is pivoted towards the second jaw to clamp the sway brace pipe between the first jaw and the second jaw and the brace clamp is attached to the sway brace pipe; and
the upper jaw surface comprises at least one of a fastener recess or a fastener notch, and wherein the bolt head is configured to engage the at least one of the fastener recess or the fastener notch to prohibit rotation of the clamp fastener.

2. The sway brace fitting assembly of claim 1, wherein:
in the disengaged configuration, the clamp fastener is disengaged from the second jaw; and
in the engaged configuration, the clamp fastener is engaged with the second jaw.

3. The sway brace fitting assembly of claim 2, wherein:
the brace clamp defines a front clamp end and a rear clamp end;
the second jaw is pivotably coupled to the first jaw proximate to the rear clamp end;
a fastener opening extends through the first jaw proximate to the front clamp end;
the clamp fastener is received through the fastener opening; and
the at least one of the fastener recess or the fastener notch is adjacent to the fastener opening.

4. The sway brace fitting assembly of claim 3, wherein the clamp fastener comprises a threaded clamp bolt, the threaded clamp bolt comprising a bolt head and a threaded bolt shaft extending from the bolt head, the bolt head configured to engage an upper jaw surface of the first jaw.

5. The sway brace fitting assembly of claim 4, wherein:
a fastener slot extends into the second jaw at the front clamp end,
an intermediate portion of the threaded bolt shaft is received through the fastener slot in the engaged configuration; and
the threaded bolt shaft is disengaged from the fastener slot in the disengaged configuration.

6. The sway brace fitting assembly of claim 5, wherein:
the threaded bolt shaft further defines a distal shaft end opposite the bolt head;
the intermediate portion is disposed between the distal shaft end and the bolt head;
the clamp fastener further comprises a clamp nut threadedly mounted on the distal shaft end; and
the clamp nut is tightened toward the intermediate portion in the engaged configuration.

7. The sway brace fitting assembly of claim 1, wherein the second jaw pivotably coupled to the first jaw at a hinge, the hinge comprising a first hinge opening formed through the first jaw, a second hinge opening formed through the second jaw, and a hinge pin received through each of the first hinge opening and the second hinge opening.

8. The sway brace fitting assembly of claim 7, wherein the hinge is a multi-position hinge, and wherein:
a third hinge opening is formed through the first jaw;
in a first position, the hinge pin engages the first hinge opening and the second hinge opening; and
in a second position, the hinge pin extends through the third hinge opening and the second hinge opening.

9. The sway brace fitting assembly of claim 7, wherein the hinge is a multi-position hinge, and wherein:
a third hinge opening is formed through the second jaw;
in a first position, the hinge pin engages the first hinge opening and the second hinge opening; and
in a second position, the hinge pin extends through the first hinge opening and the third hinge opening.

10. The sway brace fitting assembly of claim 1, wherein the pipe strap further comprises a strap mount extending from the U-shaped strap body, and wherein the brace clamp is coupled to the strap mount.

11. The sway brace fitting assembly of claim 10, wherein a strap mounting hole is formed through the strap mount, a clamp mounting hole is formed through either the first jaw or the second jaw of the brace clamp, and a mounting fastener engages the strap mounting hole and the clamp mounting hole to couple the brace clamp to the strap mount.

12. A method of coupling a brace clamp to a sway brace pipe, the method comprising:
- receiving the sway brace pipe through a clamp channel of the brace clamp in a disengaged configuration of the brace clamp, wherein the clamp channel is defined between a first jaw of the brace clamp and a second jaw of the brace clamp, the first jaw defines an upper jaw surface, and the upper jaw surface comprises at least one of a fastener recess or a fastener notch;
- pivoting the first jaw towards the second jaw, wherein a clamp fastener of the brace clamp is coupled to the first jaw;
- engaging a bolt head of the clamp fastener with the at least one of the fastener recess or the fastener notch to prohibit rotation of the clamp fastener; and
- coupling the clamp fastener to the second jaw to retain the brace clamp in an engaged configuration, wherein, in the engaged configuration, the sway brace pipe is clamped between first jaw and the second jaw.

\* \* \* \* \*